US012795022B2

(12) United States Patent
Ray

(10) Patent No.: US 12,795,022 B2
(45) Date of Patent: Nov. 10, 2026

(54) WEARABLE TECHNOLOGY AND BIOMETRICS WITHIN CONTACT CENTER ENVIRONMENTS

(71) Applicant: State Farm Mutual Automobile Insurance Company, Bloomington, IL (US)

(72) Inventor: Christopher Ray, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 158 days.

(21) Appl. No.: 18/673,918

(22) Filed: May 24, 2024

(65) Prior Publication Data

US 2025/0365370 A1 Nov. 27, 2025

(51) Int. Cl.

*H04M 3/51* (2006.01)
*G06F 40/35* (2020.01)
*H04M 3/523* (2006.01)

(52) U.S. Cl.

CPC .......... *H04M 3/5175* (2013.01); *G06F 40/35* (2020.01); *H04M 3/5232* (2013.01)

(58) Field of Classification Search

None
See application file for complete search history.

(56) References Cited

U.S. PATENT DOCUMENTS

2003/0212567 A1* 11/2003 Shintani ................. G06Q 99/00 725/105
2005/0135595 A1* 6/2005 Bushey ............... H04M 3/5191 379/265.09
2006/0173724 A1* 8/2006 Trefler ................ H04M 3/5233 705/7.14
2012/0296642 A1* 11/2012 Shammass .............. G10L 25/63 704/211
2016/0042371 A1* 2/2016 Klemm .............. G06Q 30/0203 705/7.32
2018/0110460 A1* 4/2018 Danson ................ A61B 5/0022
2021/0358324 A1* 11/2021 Lahiri .................... G06N 20/00
2024/0169298 A1* 5/2024 Mayhue ................. G06N 3/084

* cited by examiner

*Primary Examiner* — Duc Nguyen
*Assistant Examiner* — Assad Mohammed
(74) *Attorney, Agent, or Firm* — Lee & Hayes, P.C.

(57) ABSTRACT

Within a contact center environment, a biometrics system may capture and analyze the biometric data of representatives for improved live contact routing and workload management. Various biometric technologies, including wearable devices, cameras, and other sensors in the contact center environment, may capture biometric data from representatives during and/or after live communication sessions. The biometric patterns of representatives may be correlated with physiological indicators, such as stress, focus, mood, and particular emotions, to determine representative-specific associations between the characteristics of interactive communication sessions and corresponding physiological indicators. The contact center servers may use the representative-specific associations to control automated processes within the contact center, including contact routing based on predicted session characteristics, representative task scheduling, and workload management.

20 Claims, 8 Drawing Sheets

WEARABLE TECHNOLOGY AND BIOMETRICS WITHIN CONTACT CENTER ENVIRONMENTS

TECHNICAL FIELD

The present disclosure relates to automated processes for controlling and managing contact center environments. In particular, the present disclosure relates to using wearable devices, cameras, and other technologies to capture biometric data of representatives in the contact center environment, and correlating the representative biometric data with physiological indicators and characteristics of communication sessions and other contact center tasks.

BACKGROUND

Many organizations use automated contact centers to handle interactions between representatives of the organization and customers or other parties. Different types of organizations, including businesses, government agencies, and educational institutions may use automated contact centers for various tasks, such as sales, customer service, technical and software support, problem resolution, and the like. Automated contact center architectures may be small or large-scale, depending on the services provided, the amount of customer traffic, the structure of the organization, etc. Large-scale contact centers may include any number of representatives trained and assigned to different roles or departments, interacting via various client systems that may be distributed across different data centers, geographic locations, and/or networks. In some cases, a customer call or other live contact (e.g., a video or chat session) received at the contact center may be answered first by an automated computer system, which may request a series of inputs from the customer to determine where the contact should be routed.

The various hardware, network, and software components of a contact center may be operable to support interactive communication sessions (which also may be referred to as live contacts) between customers and organization representatives, each of which may be operating independently on separate computing devices. Different contact center environments may support different combinations of interactive communication session types and/or media types, including external or internal voice sessions (e.g., telephony-based), video sessions, chat sessions, email communications, social media-based sessions, etc. Some contact centers support targeted routing of contacts to different queues and/or specific representatives based on customer or contact attributes (e.g., geographic location, spoken language, network/session type, etc.) as well as the customer's responses to automated phone menus, voice response units, conversation bots, and the like. Additionally, some contact centers may use automated tools to assist representatives in managing interactions with customers during a live contact, such as automated prompting of cross-selling or upselling opportunities, sentiment analysis tools, escalation guidelines, etc. Certain contact center environments also may use automated workload management software to queue live contacts, and to assign additional tasks to representatives who are not currently engaged in interactive sessions with customers. The workload management software also may track representative work tasks, evaluate representative metrics, etc.

In conventional contact centers, requests for interactive communication sessions (e.g., incoming customer calls) may be routed to particular representatives based on various factors, such as current availability, language, technical skill set, seniority, and the like. However, existing contact routing systems often do not detect or take into account additional factors, such as the levels of stress, focus, and mood of the representatives, that can significantly impact the experience and productivity of the customer-representative interaction. For example, when a contact center representative is working under difficult or stressful conditions, the representative's stress, mood, or lack of focus may negatively impact a customer interaction and the overall aims of the organization. Additionally, when the work assignments, customer interactions, and workload management of the contact center fail to keep representatives motivated and focus, the contact center as a whole may see reduced production and poor employee retention for representatives and other contact center employees.

Certain existing contact center systems may attempt to analyze the work behaviors and/or stress levels of representatives, for example, using live monitoring, sentiment analysis of transcripts, performance-based metrics, and the like. Such data may be used for evaluating and/or training representatives, managing work hours, and initiating interventions by supervisors during live contacts. However, when such systems are unable to determine, in real time, the current stress levels, focus, and mood of the contact center representatives, these important factors cannot be taken account when routing live contact requests, assigning additional work tasks, and/or performing workload management within the contact center environment.

The example systems and methods described herein may be directed toward mitigating or overcoming one or more of the deficiencies described above.

SUMMARY

Described herein are systems and methods for using biometrics systems within a contact center environment to capture and analyze the biometric data of representatives for improved live contact routing and workload management. Various biometric technologies, including wearable devices, cameras, and other sensors in the contact center environment, may capture biometric data from representatives during and/or after interactive communication sessions (or live contacts) with customers. The biometric data patterns of representatives may be correlated with physiological indicators, such as stress, focus, mood, and specific emotions, to determine representative-specific associations between various characteristics of interactive communication sessions and corresponding physiological indicators. The contact center servers may use the representative-specific associations to control various automated processes within the contact center, include contact routing based on predicted session characteristics, representative task scheduling, and workload management.

In various examples, a contact center server may include a representative biometric system configured to collect biometric data from contact center representatives (e.g., on-site or off-site) operating in the contact center environment. Biometric data may be captured before, during, and/or after representatives engage in live contacts with users/customers. During a live contact (e.g., interactive communication session), the representative may interact with a user/customer via one or more communication services (e.g., a voice service, video service, chat service, etc.) in various ways. Live contacts may include sales-related contacts, customer service, technical and software support, surveys and feedback, problem resolution, and the like. Any number or combination of biometrics devices may be used to capture biometrics of a contact center representative, including (but not limited to) wearable technologies (e.g., smart watches, rings, or bracelets, fitness trackers, wearable sensors, etc.), cameras, smart phones, implanted biometric technologies, and the like. The biometrics data captured for a representative may include, for instance, pulse/heart rate data, respiration data, body temperature data, movement data (e.g., walking, pacing, fidgeting, etc.), eye tracking data (e.g., gaze direction, focus, pupil dilation, etc.), and the like.

Based on the biometric data captured for a representative in the contact center environment, the representative biometric system may determine associations between the biometric data and physiological indicators of the representative. As used herein, a physiological indicator may refer to an observable indicator of a physiological state such as stress, focus, mood, an emotion, or combination of emotions. As described below in more detail, determining associations between representative biometric data and physiological indicators can be performed based on pre-existing mapping templates, based on feedback from the representatives, and/or by analyzing the workload performance or other activities of the representative within the contact center environments. In some examples, determining an association between a pattern of biometric data and one or more physiological indicators can be performed based on data associated with a particular representative, such that the association may be specifically applicable to the particular representative. In other examples, associations may be determined between biometric data and physiological indicators based on data captured from any number of representatives (e.g., any subset or all representatives in a contact center), and the resulting associations between biometric data patterns and physiological indicators can be applicable to groups of multiple representatives.

The representative biometric system also may receive and analyze various characteristics of the live contacts associated with the captured biometric data of the representatives. For instance, when biometric data (and corresponding physiological indicators) are determined for a representative when engaging in a particular interactive communication session, the representative biometric system may analyze the communication session to determine various associated session characteristics. Examples of session characteristics may include, but are not limited to, the communication channel (e.g., media type) of the session, the type of representative client device used, the time of day of the session, the length of the session, the user with whom the representative interacted with during the session, and the like. Other characteristics of a communication session may be associated with the difficulty, emotional nature, or overall meaning of the interaction in ways that may correlate to various physiological indicators. For instance, additional examples of session characteristics may include the sentiment of the representative and/or the other participants in the communication session, whether or not the participants were argumentative or raised their voices, whether or not the representative rejected a claim or request of the user, whether the representative was exposed to depictions of injuries or property damage during the session, whether the communication session was conducted in a second (non-native) language of the representative, whether the representative performed a difficult technical task or skill during the session, and so on. In some examples, the characteristics determined for an interactive communication session may include the previous status of representative prior to the beginning of the communication session, such as the biometric status of the representative at the start of the communication session, how long that day the representative has been working in the contact center, the characteristics of any other live contacts and/or tasks performed by the representative previously during their work shift, and so on.

Based on the analysis of the interactive communication sessions conducted by a representative, including the representative's physiological indicators and corresponding session characteristics associated with the interactive communication sessions, the representative biometric system may determine mappings between session characteristics and representative physiological indicators. The mappings may be determined for particular representatives, or may be determined for various groups of representatives (e.g., teams/departments of representatives, representatives handling similar types of contacts, the contact center as a whole, etc.). For example, for a first representative, a biometrics-based mapping may be determined between performing a particular technical task during a live contact and/or engaging with an angry or argumentative user, and a physiological indicator of a decreased level of focus and/or negative mood. In contrast, a second representative may have a different mapping in which performing the same technical task and/or encountering a similarly angry or argumentative user may result in an increase in energy and focus by the second representative. As another example, a first representative may exhibit a high-stress physiological indicator when the representative is required to give disappointing news to the user (e.g., rejection of a claim, failure to grant a refund, notifying that the user is illegible for a benefit, etc.). A second representative in this example may maintain a low-stress physiological indicator in similar situations, unless the second representative is also exposed to graphic depictions of personal injuries or property damage when presenting the disappointing news to the user. A third representative in this example may maintain a low-stress physiological indicator in similar situations when the other user in the communication session is an adverse or neutral party (e.g., a counterparty in a negotiation or claim, a third-party, etc.), but may exhibit a high-stress physiological indicator when the other user is a member or customer of the same organization (e.g., to whom the representative feels a responsibility or duty).

The contact center server(s) may use the mappings (and/or other stored associations) between communication session characteristics and corresponding physiological indicators for a representative, or for groups of representatives, to control the various automated systems within the contact center environment. In some examples, a contact center management system may determine predicted session characteristics for a requested live contact, and may assign a representative to handle the contact automatically based on mappings between the predicted session characteristics and corresponding representative-specific physiological indicators. The contact center management system also may assign other contact center tasks to representatives (e.g., other than live contacts) and/or may perform automated workload management based on the mappings between session characteristics and physiological indicators for the various representatives in the contact center.

In certain examples of the present disclosure, a method is described for using biometric data to control a contact center environment. The method in these examples may include receiving session data associated with an interactive communication session between a first representative in the contact center environment and a remote user, and determining, based on the session data, a session characteristic associated with the interactive communication session. The method in these examples also may include receiving biometric data associated with the first representative, for a time period corresponding to the interactive communication session, and determining, based on the biometric data, a physiological indicator of the first representative. The method may further include determining an association between the session characteristic and the physiological indicator of the first representative, and controlling an automated function of the contact center environment, based on the association between the session characteristic and the physiological indicator of the first representative.

In other examples of the present disclosure, a contact center server may comprise one or more processors and memory storing computer-executable instructions that, when executed by the one or more processors, cause the one or more contact center server to perform various operations. The operations may include receiving, at the contact center server, a request for an interactive communication session associated with a remote user, and determining a predicted session characteristic based on the request for the interactive communication session. The operations also may include retrieving, from a data store, a mapping between the predicted session characteristic and a first physiological indicator of a first representative in a contact center environment, and assigning a representative to the interactive communication session, based on the mapping. Further, the operations may include initiating the interactive communication session between the representative and the remote user.

In still other examples of the present disclosure, one or more non transitory computer readable media may store instructions executable by a processor, wherein the instructions, when executed by the processor, cause the processor to perform various operations. The operations in these examples may include receiving, at a contact center server, a request for an interactive communication session associated with a remote user, and determining a predicted session characteristic based on the request for the interactive communication session. The operations may further include retrieving, from a data store, a mapping between the predicted session characteristic and a first physiological indicator of a first representative in a contact center environment, and assigning a representative to the interactive communication session, based on the mapping. Additionally, the operations may include initiating the interactive communication session between the representative and the remote user.

As discussed below in more detail, the features and techniques implemented and described herein, including using the representative biometric system to control and manage the automated processes of contact centers, may improve the performance and efficiency of contact center environments in several respects. In some examples, determining and storing mappings and representative-specific associations between session characteristics and physiological indicators may be used for improved contact routing. For instance, requests for live contacts may be routed to particular representatives based on the predicted session characteristics of the live contacts, and the corresponding predicted physiological effects on the various representatives. The improved contact routing may take into account the predicted physiological effects of the representative, to improve user and representative satisfaction during the communication session of the live contact, as well as improving contact outcomes for the organization, reducing interventions and unnecessary callbacks, and improving contact metrics (e.g., sales, service satisfaction, etc.). The techniques described herein also may allow contact center servers to automatically improve representative working conditions on the scale of individual representatives, to provide less stressful and difficult communication sessions and other tasks that negatively impact the representative's stress, mood, focus, or emotions. Thus, these techniques also may improve representative motivation, focus, and overall production, and improve employee retention for representatives and other contact center workers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
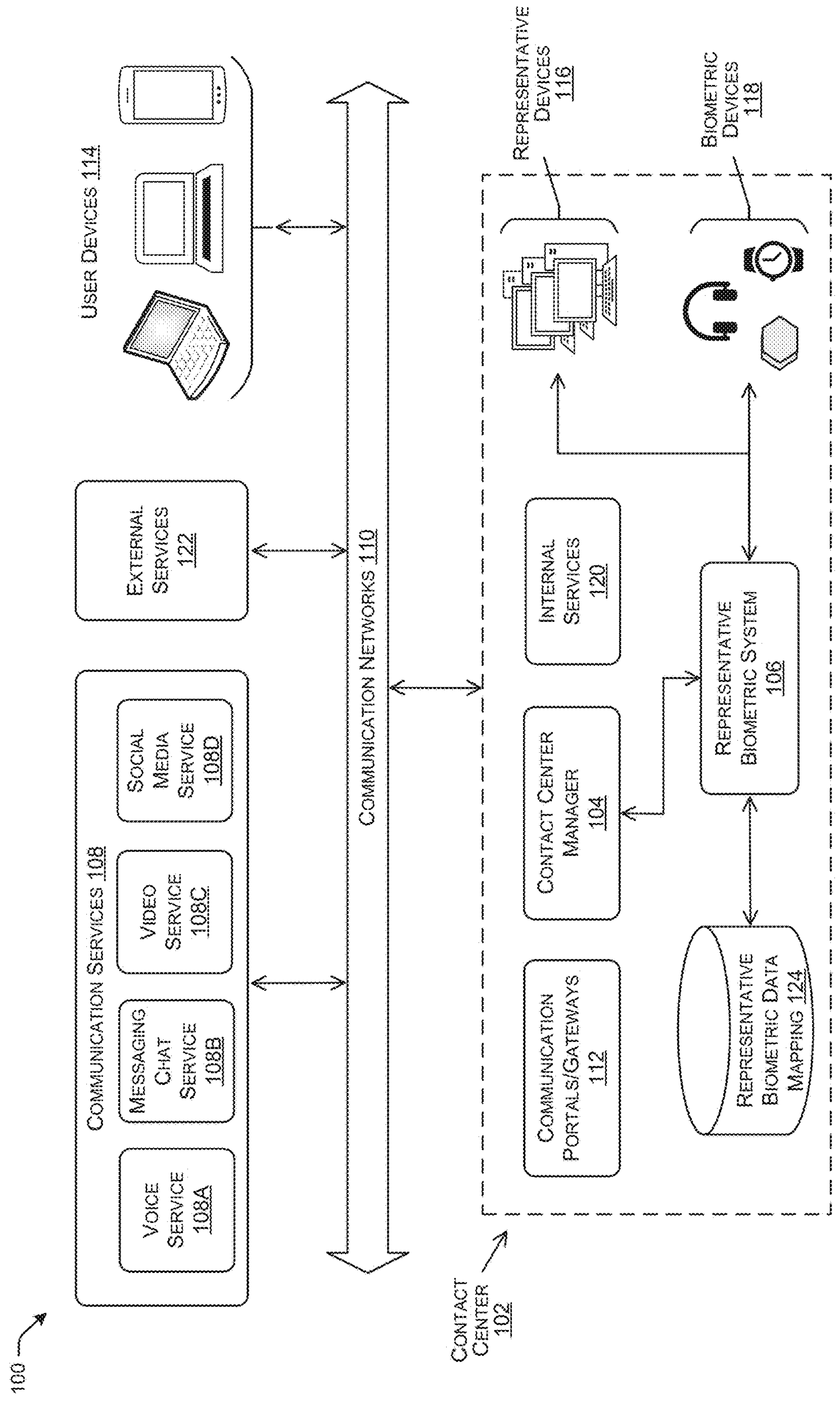
FIG. 1 illustrates an example computing environment associated with a contact center, including a contact center manager and a representative biometric system configured to capture and use representative biometric data to control the contact center, in accordance with one or more examples described herein.

FIG. 1 illustrates an example computing environment associated with a contact center 102. As shown in this example, contact center 102 includes a number of components configured to provide various contact center functionality, including a contact center manager 104 and a representative biometric system 106. As described below in more detail, the representative biometric system 106 may be configured to capture biometric data associated with representatives working in the contact center environment, and to determine mappings between the representative's biometric data and physiological indicators of the representative (e.g., stress levels, focus levels, moods, emotions, etc.). The representative biometric system 106 also may be configured to determine various session characteristics of the communication sessions engaged in by the representatives, and to determine mappings between the representatives working in the contact center environment, and to determine mappings between the physiological indicators of the representatives and the session characteristics. As shown in this example, the mappings associated with representative users (and/or other users in the contact center environment) may be stored in one or more biometric mapping data store(s) 124. The contact center manager 104 may be configured to use the mappings determined by the representative biometric system 106 to control various automated processes within the contact center 102, including automated contact routing based on the predicted characteristics of requested communication sessions, representative task scheduling, and workload management.

As shown in this example, various components of the contact center environment 100 may be implemented within the contact center 102, while others may be external to the contact center 102. For example, representative devices 116 (e.g., computing devices and/or terminals through which representative users conduct communication sessions and perform other contact center tasks), and/or biometrics devices 118 (e.g., computing devices configured to capture representative biometric data) may be implemented as internal components within the contact center 102. As shown in FIG. 1, representative devices 116 and biometrics devices 118 described herein may be internal to the contact center 102, for example, operating within an on-premise contact center facility maintained by the contact center organization. Additionally or alternatively, any or all of the representative devices 116 and/or biometrics devices 118 may operate as off-premise devices that are external to the contact center 102 (e.g., for representatives working from home or other work locations remote to the on-premise contact center facility). Representative devices 116, whether they are implemented as on-premise devices within the contact center 102 (as shown in this example), or are implemented external to the contact center 102 (e.g., home or remote representative devices) may access the various internal and external systems and services of the contact center environment 100 via communication networks 110 and/or gateways.

Contact center environments, as described herein, may include fully automated and/or semi-automated computing environments. As noted above, the dotted box representing the contact center 102 may identify the internal components of the contact center, while the components outside of the dotted box may represent external components associated with the contact center. In some examples, an internal component of a contact center 102 may refer to a component (e.g., computer server or device, network component, software service, application, etc.) that is controlled by the organization operating the contact center. In contrast, an external component of the contact center 102 may refer to a component that interacts with at least one internal component of the contact center, but which is not controlled by the organization operating the contact center.

As shown in this example, the external components associated with the contact center environment 100 may include a number of external communication services 108A-108D (collectively "communication services 108"), and/or additional external services 122 (e.g., external software tools provided by third-party entities to perform contact center functionality). Additionally, user devices 114 may include various devices/terminals through which users can communicate with representatives and/or access other contact center resources via the communication network(s) 110. User devices 114 may be remote to the contact center 102 and geographically distributed, and may include devices having any number of non-uniform computing device types, architectures, operating systems, network interfaces, client applications, and the like, which allow the user devices 114 to access the resources of the contact center 102 via one or more communication portals/gateways 112.

In various implementations, the internal components of the contact center 102 may reside within a single server and/or single data center operating at a geographic location. In such cases, some or all of the internal components of the contact center may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via communication networks 110, including but not limited to computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

As noted above, contact center 102 may be implemented via the computing environment of the contact center shown in FIG. 1 to provide interactive communication sessions (or interactive sessions) between users (e.g., customers) using various types of user devices 114, and representatives of the organization using representative client devices (e.g., representative devices 116). User devices 114 and/or representative devices 116 may include any types of personal computing devices, such as desktop or laptop computers, mobile devices (e.g., smartphones, tablet computers, etc.), wearable computing devices, or any other device capable of communicating over communication network(s) 110. In some scenarios, a customer, client, or other individual associated with the organization may use a user device 114 to contact the organization via a point-of-contact service, such as communication portals/gateways 112 (e.g., web portal(s), voice gateway, video gateway, etc.). In some examples, the communication portals/gateways 112 of the contact center 102 may include different services associated with different communication types, such as a first web portal to process web chat requests received via a help/chat link on the organization's web site, a second voice gateway to process voice calls received via a telephone network and/or Voice over IP (VOIP) calls. Although only one component for communication portals/gateways 112 is shown in the contact center 102 in this example, any number of additional customer portals/gateways may be used in other implementations, such as portals or gateway services for voice communications from user devices 114, video communications, messaging/chat communications, social-media based communications, customer relationship management (CRM) based communications, etc.

After a user device 114 initiates communication with the contact center 102 to request a communication session (or vice versa), the contact center 102 may assign the requested communication session to a representative and initiate an interactive session between the user device 114 and the representative device 116 of the assigned representative. Interactive sessions may include voice sessions, video sessions, messaging/web chat sessions, social media sessions, and/or CRM sessions, etc. As shown in this example, the contact center 102 may use communication services 108 to implement the functionality of providing the interactive sessions between user devices 114 and representative devices 116. For instance, the contact center 102 may use a first external voice service 108A, a second external messaging/chat service 108B, a third external video service 108C, a fourth external social media service 108D, and so on. In various examples, the contact center 102 may use any combination communication service providers implemented within external or internal services.

Along with the communication services 108 that provide communication services to implement interactive sessions between users and contact center representatives, the contact center environment 100 also may include internal services 120 and/or external services 122 (e.g., data sources and/or contact center tools) to provide and support additional features and functionalities of the contact center 102. Various internal services 120 and/or external services 122 may include services configured to provide data relating to specific individuals, including specific users or specific representatives. For instance, external services 122 may include one or more of governmental databases, educational institutions, financial institutions, workplace databases, social media servers, and/or other third-party data sources. The external data retrieved for users, representatives, and/or other individuals may include demographic data (e.g., age, occupation, marital status), geographic data (e.g., the individual's home state, county, or city, and/or current location), financial/purchase data (e.g., income, recent larges purchases, etc.), or life event data (e.g., recent marriages, divorces, children, etc.). External services 122 also may include services providing contact center-related functionality to the contact center 102, for example, software-based tools such as transcript generation and analysis tools, customer sentiment analysis tools, sales script tools, contact monitoring tools, network monitoring tools, data analytics tools, workforce management tools, post-interactive session survey tools, etc. As with the communication service providers 108, the external services 122 are depicted herein as external components of the contact center environment 100, but some or all of these services (e.g., data sources and tools) may be implemented as internal services 120 within the internal (e.g., secure) computing architecture of the contact center 102.

When a user initiates communication with the contact center 102 (e.g., via a web portal or voice gateway of the communication portals/gateways 112), the contact center 102 may initially select a particular communication service 108A-108D for the representative-user communication session. In some examples, the contact center manager 104 may determine which communication service 108 to use based on the specific web portal or gateway through which the user device 114 initiated the communication. Additionally or alternatively, the contact center manager 104 may select a particular type of communication service 108 based on the preferences of the user, the characteristics and capabilities of the user device 114 (e.g., whether the user device 114 has a keyboard, a microphone, a video display screen, etc.), and the like. The contact center manager 104 then may initiate an interactive session between the user device 114 and a selected representative device 116. In some examples, the user device 114 may initiate communication sessions by first contacting the contact center 102 (e.g., via a web portal or voice gateway), while in other examples, a user device 114 may initially contact an external communication service 108 directly. For example, the customer service links on an organization's web site may be hosted by and/or redirected to particular external services 122.

In some examples, a user communication into the contact center 102 may be answered first by an automated computer system (e.g., implemented by an external communication service 108 or an internal service 120), which requests and receives a series of inputs from the user. Such automated systems may be implemented as voice response units for voice calls, conversation bots for web chat sessions, etc. The inputs requested from the user via an automated system may include data identifying the user (e.g., customer name, account number, ticket number, etc.), the purpose of the contact (e.g., a question type, a product model, etc.), or the language or geographic region of the user, and the like. Based on the user's responses, the automated system may determine where to direct the user for an interactive session, for instance, to a particular data center, a particular department of the organization, a particular representative having a specific role, criteria, or credentials, or to a particular representative that has had previous contact with the user, etc.

In some examples, the contact center manager 104 may include internal systems for preprocessing, queuing, routing, etc., which may be used to select an external communication service 108 and initiate a communication session between the user device 114 and a selected representative device 116. After initiating the communication session, the internal systems of the contact center manager 104 may extricate themselves from the communication channel and allow the selected communication service 108 to manage the session. For example, the internal operational systems and/or components of the contact center manager 104 may receive and analyze data associated with an incoming request for an interactive session from a user device 114, determine a queue and/or select a representative to handle the live contact, and assign the interactive session to a communication service 108 which may initiate and manage the interactive session between the user device 114 of the customer and the representative device 116. The contact center manager 104 also may include internal systems and components to receive and handle requests to transfer contacts from one representative to another, initiate multi-party interactive sessions, and escalate communication sessions with customers to supervisors and/or administrators (e.g., via separate supervisor devices and/or administrator devices internal or external to the contact center 102). The contact center manager 104 also may include internal systems and components to monitor and analyze the interactive sessions to determine performance metrics for individual representatives, teams, and for the contact center 102 as a whole, and to implement policies and instructions based on various models (e.g., contact quality models, efficiency models, workflow projection models, etc.).

In some examples, the contact center 102 may support any number of different communication services 108 (e.g., external or internal to the contact center 102), via a common interface and framework, and may support "plug-and-play" functionality to add, remove, and prioritize different communication services 108 within the contact center environment 100. Such systems may support replacement or modification of the communication services 108 used by the contact center 102 without requiring any software change within the client applications executing on the user devices 114, representative devices 116 and/or other internal systems within the contact center manager 104. For instance, a voice service 108A (or any other communication service 108) provided by one external service provider can be replaced by a different voice service (or other service type) from a different service provider, without requiring any functional change to the client applications executing within the user devices 114, representative device(s) 116, supervisor device (s), administrator device(s), and/or other various internal or external systems or services. Examples of additional features and techniques for implementing an integration layer to provide a common interface and framework for the various devices and communication services (and/or other external services 122 and internal services 120) of the contact center environment 100, can be found in U.S. patent application Ser. No. 17/335,890, filed on Jun. 1, 2021, and entitled "Thick Client And Common Queuing Framework For Contact Center Environment," the contents of which are incorporated herein in their entirety for all purposes.

The contact center manager 104 also may store and manage representative profile and/or status data, based on data received from the various external and internal data sources and systems of the contact center environment 100. As described below, representative-specific mappings based on the representative biometric data may be stored in the biometric mapping data store(s) 124, including mappings between a representative's biometric data and corresponding physiological indicators (e.g., stress, focus, mood, emotion, etc.), as well as mappings between the representative's physiological indicators and corresponding communication session characteristics. For a particular representative, the mappings stored in the biometric mapping data store(s) 124 may be determined based on the representative's biometrics data (e.g., captured using one or more biometric devices 118), in conjunction with additional representative's status data, communication session data, task data, productivity data, etc., which may be determined based on various other sources within the contact center environment 100.

Figure 2A:
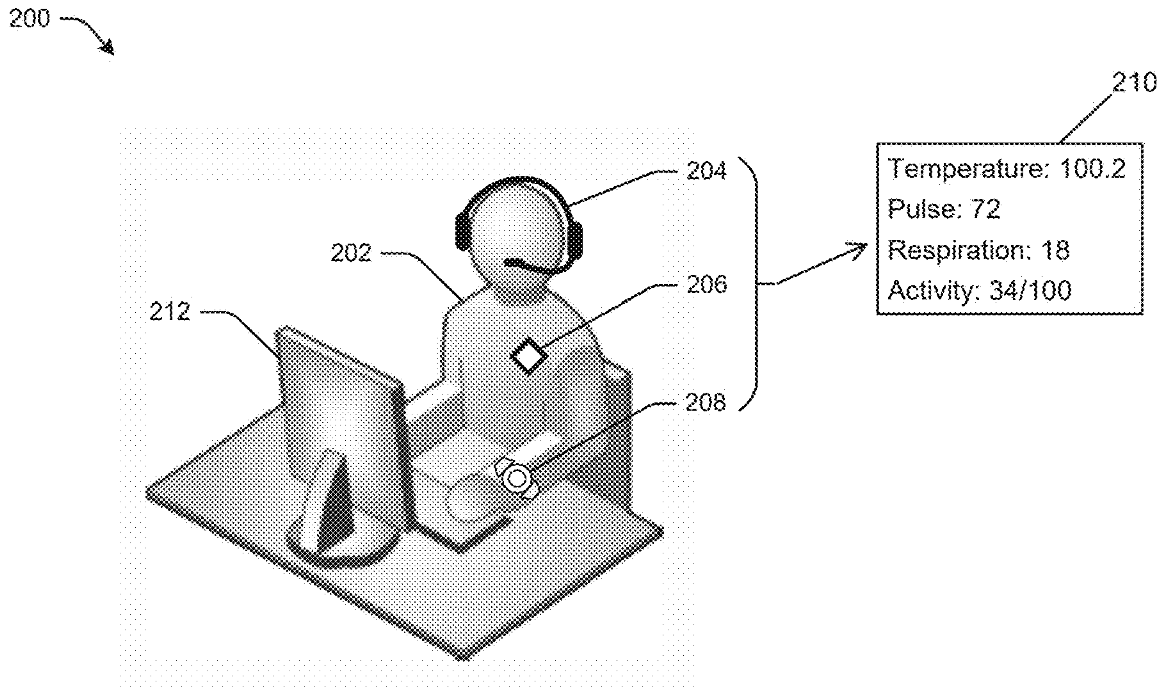
FIGS. 2A and 2B depict examples of representative users associated with a contact center, including various biometric devices configured to capture biometric data from the representatives, in accordance with one or more examples described herein.
Figure 2B:
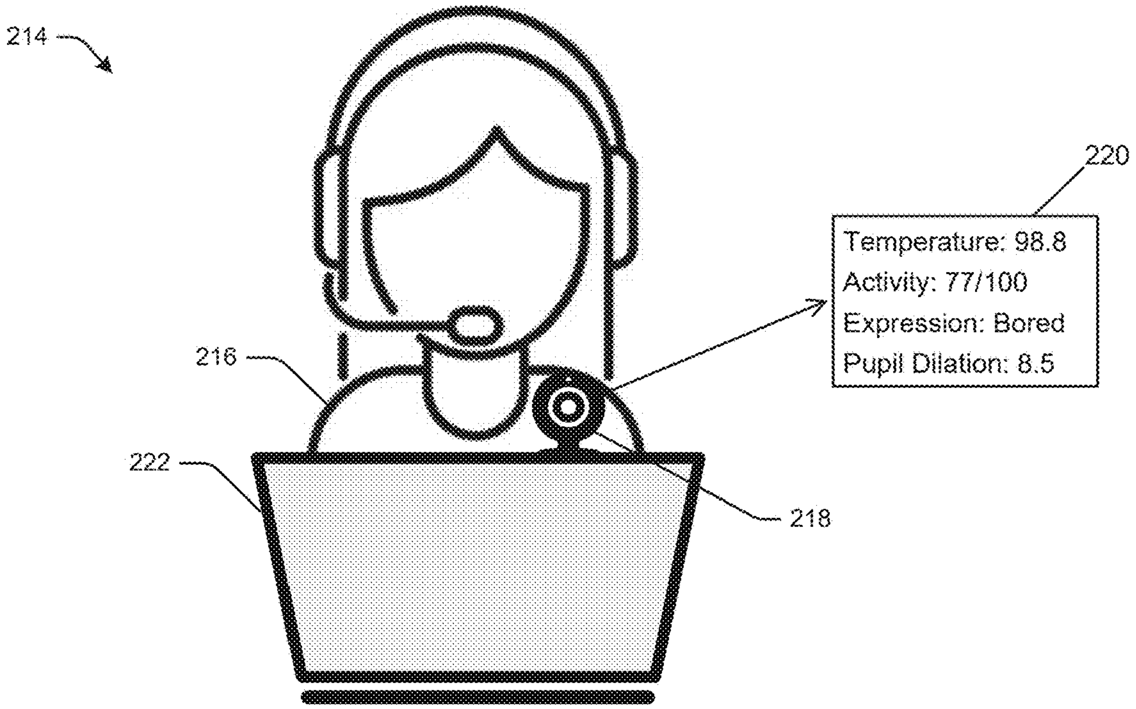

FIGS. 2A and 2B depict two examples of representative users working in a contact center environment, in which various biometric devices are configured to capture biometric data from the representatives. FIG. 2A shows a first example environment 200 in which a representative 202 is working while wearing a number of wearable biometric devices configured to capture biometric data of the representative while engaging in live contacts and performing other contact center tasks. FIG. 2B shows a second example environment 214 in which a representative 216 is working within a monitored environment including cameras and/or sensors configured to capture additional biometric data of the representative. In these examples, the contact center environments shown in FIGS. 2A and 2B may comprise workstation environments in a secure on-premise contact center facility, or may comprise other working environments in which the representatives work from home or from other locations remote to the contact center facility (e.g., which may or may not provide physical and/or communication network security).

As shown in these examples, various types of devices may be used to capture biometric data from contact center representatives, including wearable devices as shown in FIG. 2A, and non-wearable devices as shown in FIG. 2B. Any of the biometric devices described herein may be used individually or in any combination in various examples. In FIG. 2A, the representative 202 is shown wearing three separate biometric devices configured to capture biometric data of the representative 202 while working in the environment 200. Device 204 is a headset including speakers and microphone to allow the representative 202 to communicate with customers and other users via phone, videoconferencing, etc. Although used primarily for communication, the device 204 also may include any number of sensors configured to capture biometric data of the representative 202. Device 206 is a wearable biometric sensor that may attach to the representative's clothes or skin. Device 208 is a smartwatch that may be worn on the representative's wrist.

Although only three examples of wearable biometric devices are shown in this example, any number of different biometric devices may be used (and in any combination), for a single representative or different representatives in the contact center environment. For instance, additional types of biometric devices may take the form of bracelets, rings, and/or necklaces used for sleep tracking, movement tracking, etc. Additional biometric devices can include sensors affixed to the chest, arm, or elsewhere on the skin for monitoring heart rate, temperature, respiration, etc. Further examples of biometric devices that may be used in these examples include dry electrode-based devices, as well as implanted devices configured to perform in-body monitoring of the representative.

Data 210 represents an example output of biometric data captured for the representative 202, including the representative's body temperature, current pulse rate, current respiration rate, and activity/movement score. The biometric data may be captured in real-time for the representative 202, using any combination of wearable and/or non-wearable biometric devices. For example, a first device may be configured to periodically determine the representative's body temperature, a second device may be configured to periodically determine the representative's movement/activity scores at corresponding points in time, etc.

In FIG. 2B, the representative 216 is shown without any wearable biometric devices. Instead, in this example, a camera 218 are installed within the representative's working environment, and directed at the representative to capture additional biometric data of the representative. In various examples, the camera 218 may include an image/video camera, an infrared camera, thermal camera, etc., and one or more such cameras may be positioned at various locations within the contact center environment (e.g., on the representative's computer, within the representative's office or cubicle, on a shared floor for multiple representatives, etc.). In other examples, additional non-wearable sensors may be used to capture representative biometric data within the contact center environment, including lidar sensors, radar sensors, depth sensors, etc.

Data 220 represents another example output of biometric data captured for the representative 216 based on the camera 218 (and/or other non-wearable sensors). Data 220 includes the detected body temperature of the representative, the representative's activity/movement score, an analysis of the representative's facial expression and/or body language, and a pupil dilation amount for the representative. As described above for data 210, data 220 also may be captured and/or updated in real-time for the representative 216, using any combination of wearable and/or non-wearable biometric devices.

The wearable and/or non-wearable biometric devices described herein may be used in different combinations and/or different environments, to capture various types of representative biometric data. The types of biometric data that may be captured for representatives 202 and 216 may include, but are not limited to, heart rate/pulse, breathing/respiration, perspiration, body temperature, and movement data. When cameras are used to monitor the representative, additional biometric data may be captured including eye tracking data, pupil dilation, movement/fidgeting data, and the like. In examples when implanted devices are used, further biometric data may be captured for the representative, including blood pressure data, glucose data, internal temperature data, etc.

Although not depicted in these examples, the contact center environment may include additional non-biometric devices that may be configured to capture data representing the working environment of the representative. Examples of non-biometric devices may include sensors configured to capture the ambient temperature, lighting conditions, ambient/background noise, additional sounds or smells, and the like, of the representative's working environment. The additional data captured by non-biometric devices of the representative's working environment may be used in conjunction with the representative's biometric data in any or all of the examples described herein. For example, data from the representative's working environment may be combined with the representative's biometric data and may be mapped to physiological indicators and/or characteristics of communication sessions and other contact center tasks.

The various biometric devices (e.g., devices 204-208), non-biometric devices (e.g., camera 218), and/or environmental sensors described herein may be controlled by, and/or may operate in conjunction with, representative devices 116 and/or servers of the contact center environment. For example, biometric, non-biometric, and/or environmental sensor devices associated with a particular representative may transmit their captured data to that representative's client computing device. In some cases, the client-side software of a representative device 116 may be configured to control the biometric devices, non-biometric devices, and/or environmental sensors associated with a representative, such as by activating or deactivating the various devices based on the current tasks or activities being performed by the representative. In such examples, the biometric devices, non-biometric devices, and/or environmental sensors may be configured to use short-range wireless communication protocols (e.g., Bluetooth, WiFi Direct, etc.) to receive instructions and transmit data to the representative device 116 of the representative.

Additionally or alternatively, the biometric devices, non-biometric devices, and/or environmental sensors associated with a representative need not communicate with the representative device 116, but may receive control instructions and/or transmit captured data to a remote server or service of the contact center 102. In such examples, the biometric devices, non-biometric devices, and/or environmental sensors may be configured to separate communication channels (that may or may not bypass the representative device 116), including cellular or other wireless access network, Internet-of-Things (IoT) networks, etc.

In some examples, the biometric devices, non-biometric devices, and/or environmental sensors associated with a representative may be configured to operate autonomously to capture and store representative-specific data (including biometric and non-biometric data) at all times while the representative is present in the contact center environment. In other examples, these devices may autonomously operate to activate/deactivate, or to turn on/off their data capture and storage capabilities at specific times, based on the current tasks or activities being performed by the representative. For instance, these devices may be controlled autonomously or by a controlling device (e.g., a client application of the representative device 116, a backend contact center service, etc.) to deactivate when the representative is on a break, when the representative is performing non-contact center tasks, etc. In some implementations, these devices may be controlled to capture and store the representative-specific data only when the representative is actively engaged in a live contact and may deactivate (and/or cease storing or transmitting representative data) when the representative is between live contacts. Different rules for device activation/deactivation, biometrics data capture and transmission, etc., may be implemented and changed on-the-fly as needed in different operating environments. These rules may be flexible and configurable by the representative and/or by the contact center manager/administrator, for example, to improve robust capturing and analysis of representative-specific data in some instances, or to reduce computing overhead, data storage overhead, and network traffic in other instances.

Figure 3:
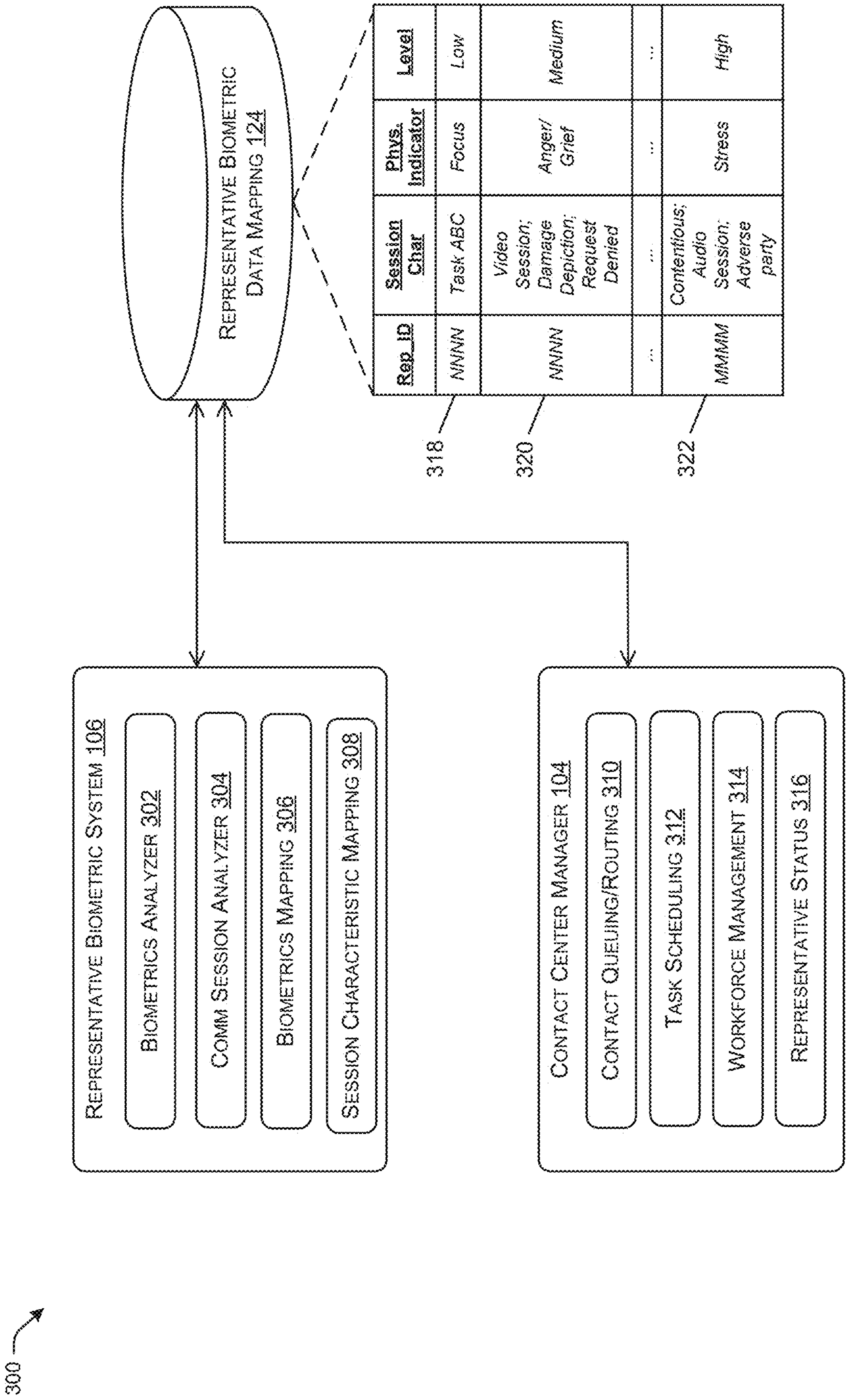
FIG. 3 depicts an example system including a representative biometric system configured to capture and analyze representative biometric data, and a contact center manager configured to control the contact center environment based on the representative biometrics, in accordance with one or more examples described herein.

FIG. 3 shows a system 300 including an example of a representative biometric system 106 configured to capture and analyze representative biometric data, and an example of a contact center manager 104 configured to control various aspects of the contact center environment based on the representative biometrics. As described below, the representative biometric system 106 may determine mappings between particular representative biometrics data and corresponding physical indicators of representatives. The representative biometric system 106 also may determine mappings between particular physical indicators of the representatives and corresponding interaction communication session characteristics.

The biometrics analyzer 302 may be configured to receive sets of biometric data for representatives working in the contact center environment. The data received by the biometrics analyzer 302 can include any combination of the biometrics devices described herein, including biometrics data captured by wearable and/or non-wearable biometrics devices. In some cases, the biometrics analyzer 302 also may receive related non-biometrics data representing the working environment of the representative (e.g., ambient room temperature, background noise, etc.). The biometrics analyzer 302 may receive the biometric data (and/or related non-biometrics data) directly from the biometrics devices, from the representative's client device, and/or from a separate service within the contact center environment configured to receive and process representative biometrics data.

After receiving various biometric data (and/or related non-biometrics data), the biometrics analyzer 302 may analyze and associate specific sets of biometric data with particular representatives, particular interactive communication sessions, and/or other particular tasks performed by representatives. For instance, the biometrics analyzer 302 may segment biometrics data received for a representative (or multiple representatives) to correspond to the start and the end of the representative's interactive communication sessions. In some instances, the biometrics analyzer 302 may determine differences (e.g., deltas) between various starting and ending biometrics data for the representative, such as the difference between the representative's heart rate, temperature, respiration, facial expression patterns, etc., from the beginning of a particular live contact to the end of the live contact. This subset of biometrics data may be stored and associated with the particular live contact. The biometrics analyzer 302 may perform similar operations for any or all representatives in the contact center environment, for any number of live contacts and/or other tasks performed by the representatives.

In some cases, the biometric effects of an interactive communication session and/or other contact center tasks may continue to be observed (and may even increase) after the communication session has ended. Therefore, in some cases, the biometrics analyzer 302 may use a predetermined time buffer (e.g., 10 seconds, 30 seconds, 1 minute, 2 minutes, . . . , etc.) to continue capturing biometrics data for a representative after a communication session has ended and associate the post-communication biometrics data with the same communication session. In some instances, rather than using a fixed-length time buffer for capturing post-communication biometrics data, the biometrics analyzer 302 may dynamically analyze the representative's biometrics patterns after a communication session has ended, to determine when the representative's biometrics have returned to baseline levels.

The communication session analyzer 304 may analyze the various interactive communication sessions engaged in by representatives in the contact center, to determine characteristics of the communication sessions. Examples of characteristics of interactive communication sessions can include any of the characteristics described herein, including (but not limited to) the sentiment of the representative during/after the communication session, the sentiment of the user during the communication session, the technical tasks or skills performed by the representative during the communication session, the language(s) spoken during the communication session, the communication media of the session (e.g., video, voice, chat, etc.), the types of client devices and device characteristics used during the communication session, the technical quality of the communication session (e.g., low resolution, buffering delays, etc.), the length of the communication session, and the like. Additionally, characteristics of interactive communication sessions can include the substantive outcome of the communication session, such as whether the representative successfully resolved the user's issue during the communication session, whether the customer purchased additional products or services during the session, whether the customer was notified that their claim accepted or rejected during the session, and the like. Further characteristics of interactive communication sessions may include the type/content of the communication, including whether or not the communication included descriptions and/or graphic representations of personal injuries and/or property damage (e.g., when discussing criminal activity, accidents, and the like for law enforcement or insurance claim processing). Additionally, in some examples, characteristics of the communication sessions also can include various characteristics of the working environment of the representative described herein, such as the room temperature, background noises, lighting conditions, etc.

The communication session analyzer 304 may use any number of tools and/or services (e.g., including internal services 120 and/or external services 122) to determine the characteristics of the interactive communication sessions of the representatives. For example, transcript analysis/sentiment analysis tools (and/or post-communication survey tools) may be used to determine the sentiment of the user and the representative. Network monitoring devices may be used to determine the device characteristics of the user's client device, the representative's client device, the media/content type of the communication session, and/or the network quality of the communication session. Additional tools, such as client monitoring software on the representative device 116, may analyze the communication session to identify the topics/categories of the session, the language(s) spoken, the length and tone of the session, whether the session included descriptions and/or graphic representations of personal injuries or property damage, and the like.

Although these examples describe the communication session analyzer 304 using various tools and services to determine characteristics of the interactive communication sessions, similar or identical techniques may be used to determine the characteristics of other tasks (e.g., non-communication session tasks) performed by the representatives in the contact center environment. For instance, when a contact center representative is not actively engaged in a communication session, the representative may be performing any number of additional tasks, including reviewing data and completing required forms prior to or after a communication session, completing training to perform various work-related tasks and skills, reviewing the various pending queue statuses of the contact center to join/unjoin particular queues, and the like. As described above, in various examples, the biometrics analyzer 302 may be used to capture and store biometrics data for representatives associated with various additional (e.g., non-communication session) tasks. Similarly, the communication session analyzer 304 may be used to analyze any of the characteristics described herein for interactive communication sessions as well as non-communication session tasks performed by representatives.

The biometrics mapping component 306 may determine mappings between patterns of representative biometrics data received by the biometrics analyzer 302 and corresponding representative physiological indicators. As discussed above, physiological indicators May include levels of stress, focus, mood, and/or particular emotions that may be experienced by a representative in a contact center environment (e.g., happiness, sadness, anger, grief, satisfaction, annoyance, confusion, boredom, etc.). The mappings determined by the biometrics mapping component 306 may include specific values, ranges, and/or movements for one or more types of biometric data. A particular biometric value, range, or change, for one or more representative biometrics, can be mapped to one or more physiological indicators. For instance, a particular heart rate range, a body temperature above/below a particular threshold, a change in respiration and/or perspiration, etc., can be mapped to a particular level of stress, focus, mood, and/or particular emotions of the representative. As one example mapping, an X % increase in heart rate, a Y degree increase in body temperature, and A perceived Z amount increase in perspiration of the representative may be mapped to a high stress physiological indicator. As another example, an X % lowered heart rate, a reduction in movement/fidgeting by Y amount, and a particular gaze direction pattern may be mapped to boredom physiological indicator.

In addition to these examples, it can be understood that any combination of observable biometric data can be mapped to any level of the various physiological indicators including stress, mood, focus, and any of the emotional states described herein. Further, in some cases, the mappings determined by the biometrics mapping component 306 may be specific to individual representatives, while in other cases, certain mappings between biometric data patterns and physiological indicators may be applicable to multiple representatives (e.g., groups/teams of representatives, entire contact centers, etc.). Various techniques that may be used by the biometrics mapping component 306 for determining the biometric data to physiological indicator mappings are described in more detail below in reference to FIG. 4. After the mappings are determined, the biometrics mapping component 306 may store the mappings in the representative biometric mapping data store 124.

Similarly, the session characteristic mapping component 308 may determine mappings between patterns of representative physiological indicators, and the corresponding characteristics of the interactive communication sessions determined by the communication session analyzer 304. For example, the session characteristic mapping component 308 may determine patterns of characteristics for communication sessions that may cause particular physiological indicators in the representatives engaged in those communication sessions. As an example, a communication session performed in a non-native language to the representative, that requires the representative to perform a new and technically difficult task, and/or that involves a contention dispute with the user, may be mapped to a high-stress physiological indicator. As another example, a particular category/topic of the communication session, along with a particular outcome of a communication session (e.g., acceptance of a claim, a reward or discount offered, a user expression of appreciation, etc.) may be mapped to a high satisfaction physiological indicator.

As in the above examples, it can be understood that any combination of characteristics of the interactive communication sessions can be mapped to any level of the various physiological indicators including stress, mood, focus, and any of the emotional states described herein. Further, as discussed above, the mappings determined by the session characteristic mapping component 308 may be specific to individual representatives, or may be applicable to multiple representatives (e.g., groups/teams of representatives, entire contact centers, etc.). Various techniques that may be used by the session characteristic mapping component 308 for determining the session characteristic to physiological indicator mappings are described in more detail below in reference to FIG. 5. After the mappings are determined, the session characteristic mapping component 308 may store the mappings in the representative biometric mapping data store 124. This example depicts three examples of mappings between communication session characteristics and physiological indicators of representatives. Mapping 318 indicates that a particular representative ("Rep ID=NNNN") may manifest a low level of focus when the representative performs a particular type of task ("Task ABC"). Mapping 320 indicates that the same representative may experience anger and/or grief (a medium level) when engaging in a video interactive session with a graphical depiction of an injury or damage, when the representative denies a request from the user. Mapping 322 indicates that the same representative may a high level of stress when engaging in a contentious audio session (e.g., phone call) with an adverse party (e.g., a counterparty in a negotiation or claim).

As shown in FIG. 3, the contact center manager 104 may include various components (e.g., programs, functions, services, etc.) configured to control aspects of the operation of the contact center environment 100. For instance, the contact center manager 104 may include a queuing/routing component 310 configured to assign incoming requests from users/customers for live contacts with representatives, to one or more queues and/or to specific representatives. As described above, the contact queuing and routing performed by the contact center manager 104 may be based on various factors, including the type/category of the incoming communication, the language or region of the incoming communication, user classification of the incoming communication (e.g., current customer, potential customer, third-party, adverse party, etc.), and the like. Assignment of representatives to particular queues and/or to particular live contacts can be based on factors such as representative availability, workload balancing, language and skill proficiencies, certifications and seniority, etc.

As shown in this example, the contact center manager 104 may include additional components such as a task scheduling component 312 used to assign and distribute non-communication session tasks to representatives, and to track the completion of the tasks. The workforce management component 314 may determine and track the working hours, shift schedules, break schedules, etc., of the representatives in the contact center environment, including assigning representatives to particular queues. The representative status component 316 may track the representative status within the contact center environment 100 as a whole, including determining current and future representative availability, overall representative skill sets and performance metrics, etc. The representative status component 316 also may maintain representative status data that includes the current (and/or recent) biometric data and/or physiological indicators exhibited by the current representatives in the contact center. The representative status data may include previous/historical patterns of biometric data and/or physiological indicators for particular representatives, in order to track and evaluate the current physiological states of the representatives relative to their baseline states.

Various components within the contact center manager 104 may use the mappings between communication session characteristics and physiological indicators of representatives (e.g., the mappings determined by the session characteristic mapping component 308) in various ways to control the operations and functionality of the contact center 102. For example, when performing contact queuing and/or routing of an incoming communication session request from a user, the queuing/routing component 310 may determine a set of characteristics associated with the incoming communication session request. The characteristics for the incoming request may be a combination of known and/or predicted characteristics of the requested communication session, such as the type/category of communication session, the communication medium (e.g., video, voice, chat, etc.) that will be used, the user's identity and status, the language that will be spoken, and/or the issues are likely to be discussed or resolved during the communication, etc. Using the determined and/or predicted characteristics of the requested communication session, the queuing/routing component 310 may query the biometric mapping data store 124 to retrieve the corresponding physiological indicators for any or all of the available representatives capable of handling the live contact. Based on the different physiological indicators for the available representatives, the queuing/routing component 310 may select (e.g., by determining score values) an optimal representative to handle the live contact.

Similarly, the task scheduling component 312 may use the mappings between communication session characteristics and physiological indicators when assigning non-communication session tasks to representatives in the contact center environment. For example, when a time-sensitive task requires assignment to a representative, the task scheduling component 312 may determine predicted characteristics associated with the task (e.g., time required, technical skills, etc.), and may use the corresponding physiological indicators of available representatives within the biometric mapping data store 124 to select one (or more) representatives to perform the task. Additionally or alternatively, the task scheduling component 312 may retrieve and use the recent and/or current biometric data and/or physiological states of the available representatives to determine which representative should be assigned particular tasks.

The workforce management component 314 also may use the mappings between communication session characteristics and physiological indicators, for example, when setting work schedules, determining break times, evaluating representative performance metrics, etc. For instance, based on the current biometric data and/or physiological states of a representative, the workforce management component 314 may determine that the representative should take a break, stop working for the day, etc. Based on these data and the mappings in the biometric mapping data store 124, the workforce management component 314 also may determine particular types of tasks that the representative should be assigned at the current time and/or for the rest of the representative's shift, etc.

Figure 4:
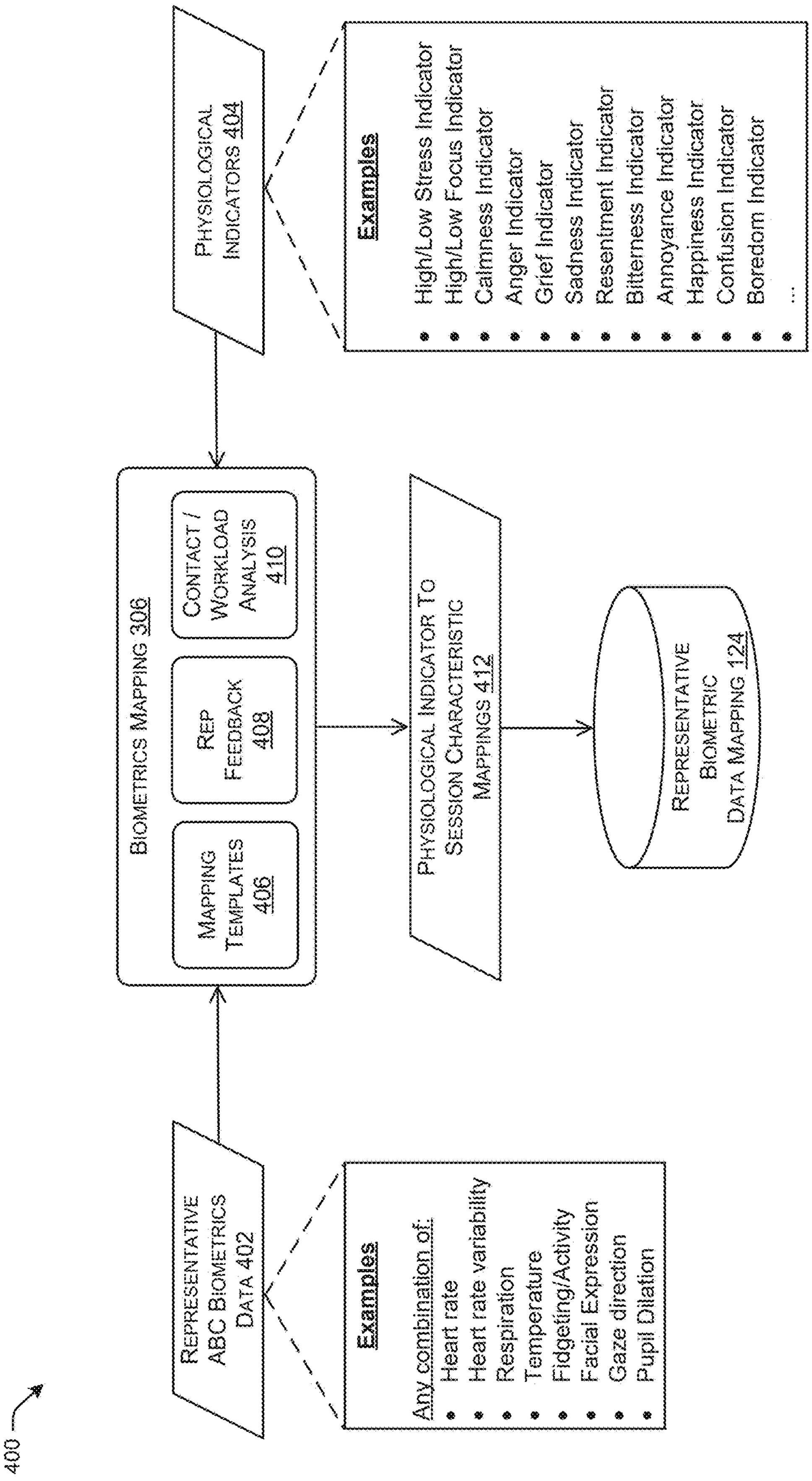
FIG. 4 depicts an example system for generating representative-specific mappings between biometric data and physiological indicators of a representative in a contact center environment, in accordance with one or more examples described herein.

FIG. 4 shows an example system 400 and related techniques by which the biometrics mapping component 306 may generate mappings between patterns of biometric data and corresponding physiological indicators for representatives in a contact center environment. As shown in this example, the mappings determined by the biometrics mapping component 306 may be associated with a specific representative. Thus, in this example, the biometric data 402 received by the biometrics mapping component 306 may be biometric data captured for (or otherwise associated with) a particular contact center representative ("Representative ABC"). Similarly, the corresponding physiological indicators 404 also may be physiological indicators experienced and/or manifested by the same contact center representative. In other examples, the biometrics mapping component 306 may receive input biometrics data and physiological indicators that are not specific to a representative, but may collected from a group of (or all) representatives in the contact center. In these examples, the mappings generated by the biometrics mapping component 306 may be generalized mappings that can be used for multiple representatives in a group or team of contact center representatives.

When the techniques described herein are used to determine representative-specific mappings, these techniques may provide additional technical advantages of greater accuracy in predicting the physiological indicators that the specific representative may experience when engaging in a communication session or performing an assigned task. As noted above, different representatives may feel and respond differently (e.g., exhibiting different physiological indicators) in similar situations. Thus, using representative-specific mappings may improve productivity, representative satisfaction and retention, and may improve the experiences of all parties within customer-representative interactions.

In contrast, when the techniques described herein are used to determine general representative (e.g., not representative-specific) mappings, the mappings potentially may be less accurate for some representatives in some instances. However, generalized mappings may be useful when there is insufficient representative-specific biometric data and/or physiological indicators to determine representative-specific mappings. Further, for many situations that a representative may encounter, most representatives may behave and react in generally the same manner (e.g., experiencing the same physiological states). Therefore, generalized representative mappings also may be useful in some cases, such as for new representatives and low-frequency interactive session scenarios (e.g., where there is insufficient training data). Generalized representative mappings also can provide improvements in reduced computing and reduced memory overhead.

To determine mappings between patterns of biometric data and corresponding physiological indicators (e.g., generalized or representative-specific mappings), the biometrics mapping component 306 may use various mapping techniques, including pre-determined mapping templates 406, representative feedback data 408, and/or a contact/workload analysis 410. These techniques may be used individually or in any combination to determine sets of generalized and/or representative-specific mappings 412 between biometric data and physiological indicators. After determining the mappings 412 between patterns of biometric data and corresponding physiological indicators, the biometrics mapping component 306 may store the mappings 412 in the biometric mapping data store 124.

The mapping templates 406 may include any number of pre-determined mappings between sets of biometric data and assumed corresponding physiological indicators. In some cases, the mapping templates 406 need not rely on received biometrics data 402 and/or received physiological indicators 404 as inputs, but may be based on pre-existing data (e.g., physiological studies describing which particular biometrics data corresponds to which physiological indicators for different people and/or in different environments). As an example, the mapping templates 406 may include predefined mappings of heart rate patterns (e.g., values, ranges, thresholds, etc.), as well temperature patterns, respiration patterns, movement patterns, perspiration patterns, and the like, which may be mapped to corresponding physiological indicators (e.g., stress levels, focus levels, physiological states and/or emotions such as tiredness, boredom, excitement, etc.).

Representative feedback data 408 may be used instead of, or in conjunction with, the mapping templates 406 to determine more accurate mappings that may apply to representatives, based on real-world situations encountered by representatives in the contact center environment. Representative feedback data 408 may include survey responses from representatives collected before, during, or after communication sessions and/or other contact center tasks performed by the representatives. The survey questions may directly or indirectly inquire about the representative's levels of stress, focus, moods, emotions, and/or other physiological states. The representative's survey responses can be recorded and associated with the representative's current biometric data state (and/or recent changes in the biometric state of the representative), to correlate the representative's biometric data patterns to the stated stress levels, focus levels, moods, and other physiological states of the representative.

A contact/workload analysis 410 may be performed as an additional technique, individually or in any combination with mapping templates 406 and/or representative feedback data 408. In a contact/workload analysis 410, the biometrics mapping component 306 may analyze any observable behaviors of a representative while working within the contact center environment 100. Examples of observable behaviors of the representative may include the representative's sentiment during live contacts, the representative's productivity when performing tasks, timing and duration of the representative's breaks and work shifts, etc. Certain observable behaviors may be determined as correlating (and/or caused by) certain physiological states. For instance, an increase in breaks, smoking, or unusual fidgeting behaviors may be the result of increased stress levels of a representative. In these examples, the biometrics mapping component 306 may correlate certain observable behaviors of a representative to a set of corresponding physiological states, and then may correlate the current and/or recent biometric data of the representative to the corresponding physiological states.

Figure 5:
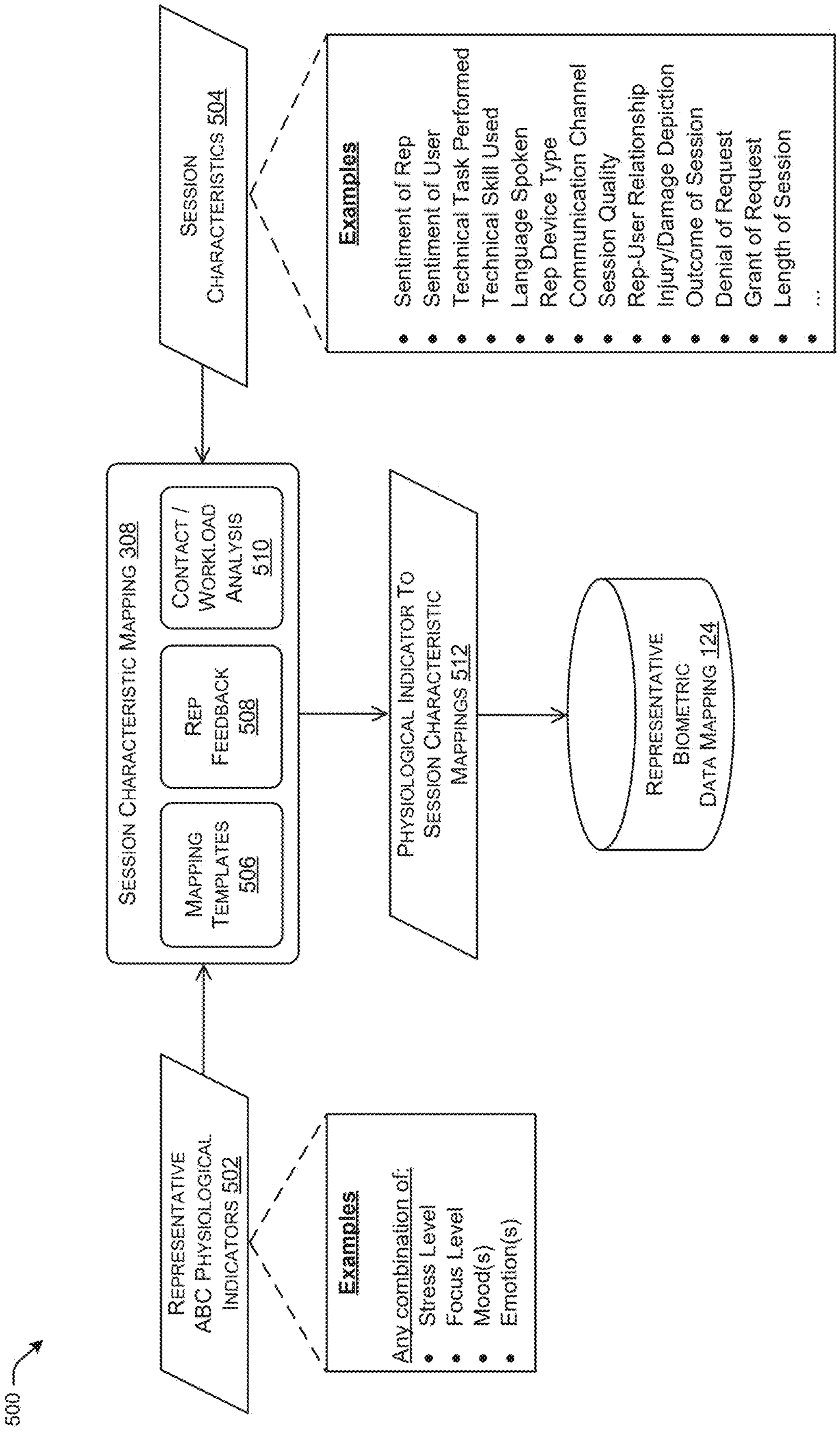
FIG. 5 depicts an example system for generating representative-specific mappings between physiological indicators and live contact session characteristics, in accordance with one or more examples described herein.

FIG. 5 shows an example system 500 and related techniques by which the session characteristic mapping component 308 may generate mappings between characteristics of interactive communication sessions (and/or other contact center tasks) and corresponding physiological indicators for representatives in the contact center environment. In some implementations, the system 500 may be implemented in a similar manner and/or in conjunction with system 400. As in the previous example, the mappings determined by the session characteristic mapping component 308 may be associated with a specific representative, and/or may be generalized mappings (e.g., not specific to a particular representative). For representative-specific mappings, the physiological indicators 502 may be physiological indicators experienced and/or manifested by a particular representative, and the session characteristics 504 may be characteristics of interactive communication sessions (and/or other tasks) engaged in by the same representative. For generalized mappings, the physiological indicators 502 and the session characteristics 504 received by the session characteristic mapping component 308 need not be captured for or associated with a particular representative, but may collected from a group of (or all) representatives in the contact center.

As described above, representative-specific mappings and generalized mappings may provide different sets of alternative technical advantages in various examples. For instance, determining representative-specific mappings may result in greater accuracy in predicting the physiological indicators that the specific representative may experience when engaging in certain communication sessions and/or performing certain tasks. Thus, representative-specific mappings may improve productivity, representative satisfaction and retention, and may improve the experiences of all parties within customer-representative interactions. In contrast, determining generalized mappings may provided advantages when there is insufficient ground truth data to determine representative-specific mappings for new representatives and/or low-frequency session characteristics. Generalized representative mappings also can provide improvements in reduced computing and reduced memory overhead.

To determine mappings between patterns of communication session characteristics and corresponding physiological indicators (e.g., generalized or representative-specific mappings), the session characteristic mapping component 308 may use various mapping techniques, including pre-determined mapping templates 506, representative feedback data 508, and/or a contact/workload analysis 510. These techniques may be used individually or in any combination to determine sets of generalized and/or representative-specific mappings 512 between communication session characteristics (individually or in combination) and corresponding physiological indicators. After determining the mappings 512 between various communication session characteristics and physiological indicators, the session characteristic mapping component 308 may store the mappings 512 in the biometric mapping data store 124.

The mapping templates 506 may include any number of pre-determined mappings between sets of communication session characteristics and assumed corresponding physiological indicators. In some cases, the mapping templates 506 need not rely on received physiological indicators 502 and/or received session characteristics 504 as inputs, but may be based on pre-existing data (e.g., physiological studies describing which types of interpersonal interactions and/or tasks corresponds to which physiological indicators for different people and/or in different environments). As an example, the mapping templates 506 may include predefined mappings of communication session characteristics (e.g., topics discussed, sentiments of the parties, length of session, devices used and network quality, time of day, etc.), which may be mapped to corresponding physiological indicators (e.g., stress levels, focus levels, physiological states and/or emotions such as tiredness, boredom, excitement, etc.).

Representative feedback data 508 may be used instead of, or in conjunction with, the mapping templates 506 to determine more accurate mappings that may apply to representatives, based on real-world situations encountered by representatives in the contact center environment. Representative feedback data 508 may include survey responses from representatives collected before, during, or after communication sessions and/or other contact center tasks performed by the representatives. The survey questions may directly or indirectly inquire about the representative's levels of stress, focus, moods, emotions, and/or other physiological states. The representative's survey responses can be recorded and associated with the characteristics of the representative's current and/or recent interactive communication sessions, in order to correlate particular combinations of communication session characteristics to the stated stress levels, focus levels, moods, and other physiological states of the representative.

A contact/workload analysis 510 may be performed as an additional technique, individually or in any combination with mapping templates 506 and/or representative feedback data 508. In a contact/workload analysis 510, the session characteristic mapping component 308 may analyze any observable behaviors of a representative while working within the contact center environment 100. Examples of observable behaviors of the representative may include the representative's sentiment during live contacts, the representative's productivity when performing tasks, timing and duration of the representative's breaks and work shifts, etc. Certain observable behaviors may be determined as correlating (and/or caused by) certain physiological states. For instance, an increase in breaks, smoking, or unusual fidgeting behaviors may be the result of increased stress levels of a representative. In these examples, the session characteristic mapping component 308 may correlate certain observable behaviors of a representative to a set of corresponding physiological states, and then may correlate the characteristics of the current and/or recent interactive communication sessions engaged in by the representative (and/or other tasks performed by the representative) to the corresponding physiological states.

Figure 6:
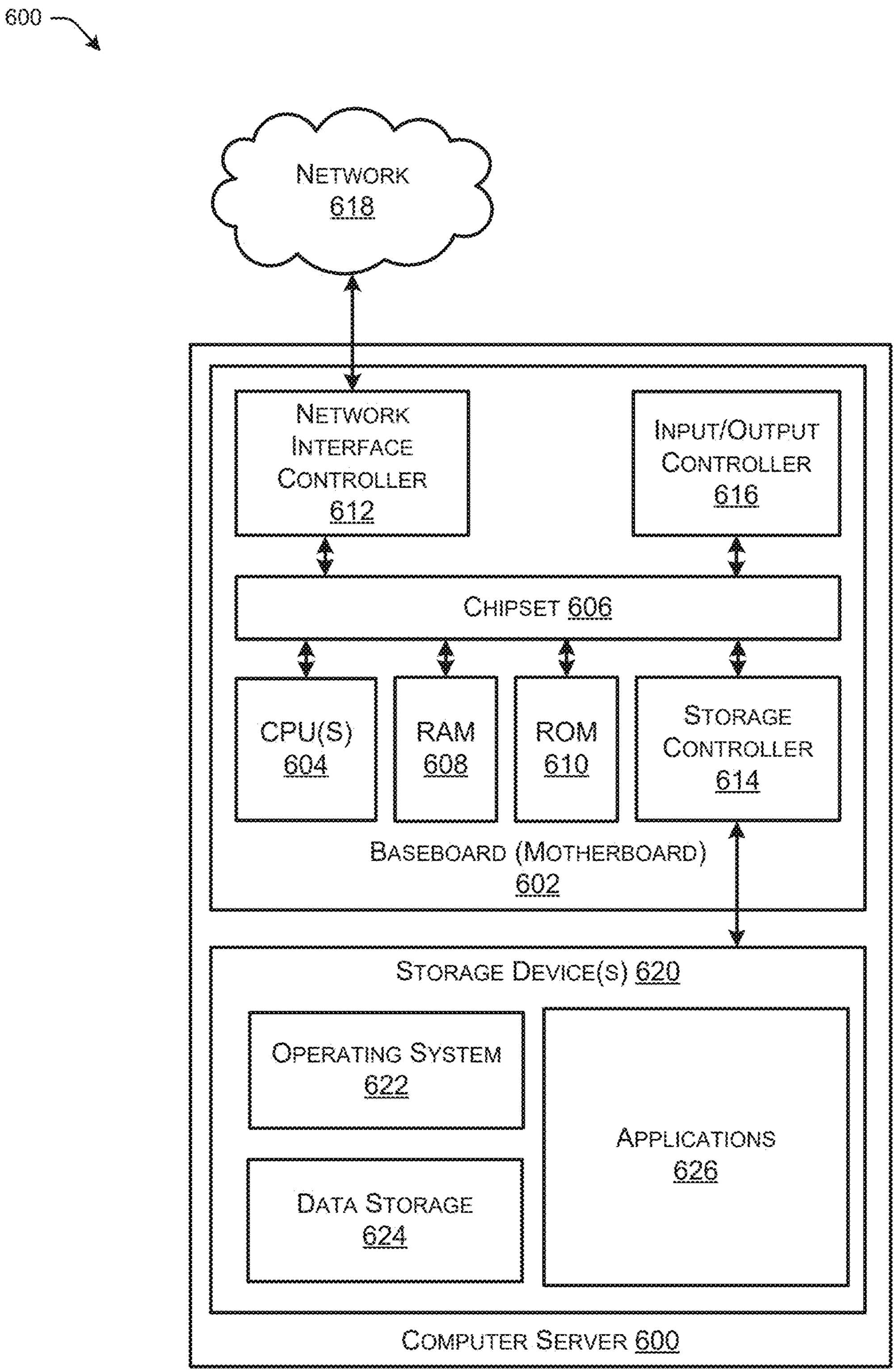
FIG. 6 shows an example system architecture for a computing device capable of executing program components in implementing various techniques described herein.

FIG. 6 shows an example computer architecture for a computer server 600 capable of executing program components for implementing the functionality described herein. The computer architecture shown in FIG. 6 may correspond to the systems and components of a server computer, workstation, desktop computer, laptop, tablet, network appliance, mobile device (e.g., tablet computer, smartphone, etc.), or other computing device, and can execute any of the software components described herein. The computer server 600 may, in some examples, correspond to any of the computing systems or devices described above, such as a contact center manager 104, representative biometric system 106, and/or any other components within or associated with a contact center 102 (e.g., a representative biometric system 106, representative devices 116, biometric devices 118, and/or any other computing devices or servers associated with a contact center 102). It will be appreciated that in various examples described herein, a computer server 600 might not include all of the components shown in FIG. 6, can include additional components that are not explicitly shown in FIG. 6, and/or may utilize a different architecture from that shown in FIG. 6. For example, biometric devices 118 may be limited feature devices with limited network interfaces, limited input/output controls and interfaces, etc.

The computer server 600 includes a baseboard 602, or "motherboard," which may be a printed circuit board to which a multitude of components or devices are connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer server 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer server 600. The chipset 606 can further provide an interface to a computer-readable storage medium such as a ROM 610 or non-volatile RAM ("NVRAM") for storing basic routines that help to startup the computer server 600 and to transfer information between the various components and devices. The ROM 610 or NVRAM can also store other software components necessary for the operation of the computer server 600 in accordance with the configurations described herein.

The computer server 600 can operate in a networked environment using logical connections to remote computing devices and computer systems through a network, such as the network 618, which may be similar or identical to communication network(s) 110 discussed above. The chipset 606 also may include functionality for providing network connectivity through a Network Interface Controller (NIC) 612, such as a gigabit Ethernet adapter. The NIC 612 is capable of connecting the computer server 600 to other computing devices over the network 618. It should be appreciated that multiple NICs 612 can be present in the computer server 600, connecting the computer to other types of networks and remote computer systems. In some instances, the NICs 612 may include at least on ingress port and/or at least one egress port.

The computer server 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

The computer server 600 can include one or more storage device(s) 620, which may be connected to and/or integrated within the computer server 600, that provide non-volatile storage for the computer server 600. The storage device(s) 620 can store an operating system 622, data storage systems 624, and/or applications 626, which are described in more detail herein. The storage device(s) 620 can be connected to the computer server 600 through a storage controller 614 connected to the chipset 606. The storage device(s) 620 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer server 600 can store data on the storage device(s) 620 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 620 are characterized as primary or secondary storage, and the like.

For example, the computer server 600 can store information to the storage device(s) 620 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer server 600 can further read information from the storage device(s) 620 by detecting the physical states or characteristics of one or more particular locations within the physical storage units.

In addition to the storage device(s) 620 described above, the computer server 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer server 600. In some examples, the various operations performed by a computing system (e.g., contact center manager 104, representative biometric system 106, etc.) may be supported by one or more devices similar to computer server 600. Stated otherwise, some or all of the operations described herein may be performed by one or more computers server 600 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 620 can store an operating system 622 utilized to control the operation of the computer server 600. In some examples, the operating system 622 comprises a LINUX operating system. In other examples, the operating system 622 comprises a WINDOWS® SERVER operating system from MICROSOFT Corporation of Redmond, Washington. In further examples, the operating system 622 can comprise a UNIX operating system or one of its variants. It should be appreciated that other operating systems can also be utilized. The storage device(s) 620 can store other system or application programs and data utilized by the computer server 600.

In various examples, the storage device(s) 620 or other computer-readable storage media is encoded with computer-executable instructions which, when loaded into the computer server 600, transform the computer from a general-purpose computing system into a special-purpose computer capable of implementing various techniques described herein. These computer-executable instructions transform the computer server 600 by specifying how the CPUs 604 transition between states, as described above. In some examples, the computer server 600 may have access to computer-readable storage media storing computer-executable instructions which, when executed by the computer server 600, perform the various techniques described herein. The computer server 600 can also include computer-readable storage media having instructions stored thereupon for performing any of the other computer-implemented operations described herein.

As illustrated in FIG. 6, the storage device(s) 620 may store one or more data storage systems 624 configured to store data structures and other data objects. Additionally, the software applications 626 stored on the computer server 600 may include one or more client applications, services, and/or other software components. For example, application(s) 626 may include any combination of the components 302-308 in a representative biometrics system 106 any combination of the components 310-316 in a contact center manager 104, and/or any or all of the various other software components described above in reference to FIGS. 1-5.

Figure 7:
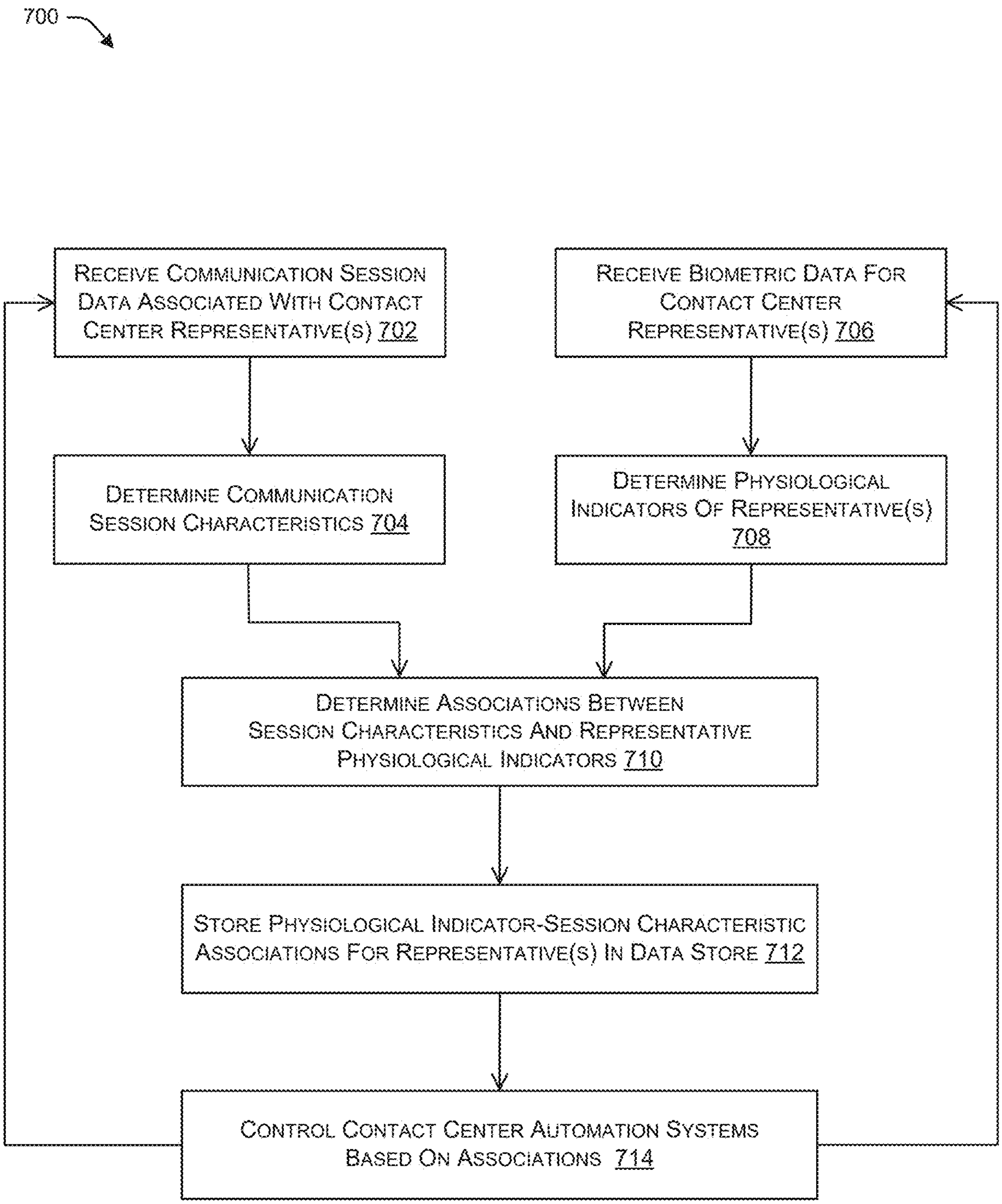
FIG. 7 is a flow diagram illustrating an example process for analyzing representative biometric data and determining associations between physiological indicators and interactive communication session characteristics, in accordance with one or more examples described herein.

FIG. 7 is a flow diagram illustrating an example process for analyzing representative biometric data and communication session characteristics, and determining associations between sets of session characteristics and physiological indicators of representatives in a contact center environment. In various examples, some or all of the operations of process 700 may be performed by components within a contact center 102, including a representative biometric system 106 and/or a contact center manager 104.

At operation 702, the representative biometric system 106 may receive data associated with various interactive communication sessions (or live contacts) of one or more contact center representatives. At operation 704, the representative biometric system 106 may analyze the communication session data to determine characteristics of the communication sessions. In some examples, the communication session data received in operation 702 may be for communication sessions associated with a particular representative (e.g., when determining representative-specific mappings), while in other examples, the received communication session data may include communication sessions associated with any number of representatives. Examples of communication session characteristics may include, but are not limited to, the communication channel (or communication media) of the session, the user and client device characteristics, the time of day of the session, the length of the session, the network quality of the session, the topics/semantic categories of the session, the user and/or representative sentiment during the session, etc. As described herein, the communication session characteristics may be determined based on data received from various systems/services in the contact center environment 100, such as transcript analysis/sentiment analysis tools, post-communication survey tools, network monitoring devices/services, the representative client software and/or monitoring programs on the representative devices 116, etc.

At operation 706, the representative biometric system 106 may receive biometric data for contact center representatives. At operation 708, the representative biometric system 106 may determine corresponding physiological indicators based on the biometric data. In some examples, the biometric data received in operation 706 may be the biometric data of the same representatives and/or the same interactive communication sessions as those discussed in operations 702 and 704. Examples of physiological indicators of the representatives may include, but are not limited to, various levels of stress (e.g., high or low), various levels of focus (e.g., high or low), various moods and/or emotions that may be experienced or manifested by the representative in the contact center environment. To determine the physiological indicators in operation 706, in some examples, the representative biometric system 106 may access mappings between patterns of biometrics data and physiological indicators (which may be representative-specific or generalized) that are stored in a biometric mapping data store 124.

At operation 710, the representative biometric system 106 may determine associations between the session characteristics determined in operation 704, and the representative physiological indicators determined in operation 708. As noted above, the associations (or mappings) between session characteristics (individual or combinations of) and representative physiological indicators can be representative-specific or generalized. To determine the mappings in operation 710, the representative biometric system 106 may use various techniques, including pre-determined mapping templates 506, representative feedback data 508, and/or a contact/workload analysis 510, as described herein. Additionally, although this example relates to mappings between communication session characteristics and representative physiological indicators, in other examples, similar techniques may be used to determine mappings between characteristics of other (non-communication session) tasks and corresponding physiological indicators of representatives performing the tasks.

At operation 712, the representative biometric system 106 may transmit the mappings between session characteristics (individually or in combination) and the corresponding representative physiological indicators, into a biometric mapping data store 124. Then, at operation 714, various additional components associated with the contact center 102 may control the operation and automated processes of the contact center environment 100 based on the mappings between the session characteristics and corresponding representative physiological indicators. For example, as described herein, various components within the contact center manager 104 may be configured to use mappings between session characteristics and physiological indicators (e.g., for individual representatives and/or groups of representatives) to route incoming requests for interactive communication sessions, assign contact center tasks, manage the workforce of contact center environments, and/or determine contact center wide representative status and availability data.

Figure 8:
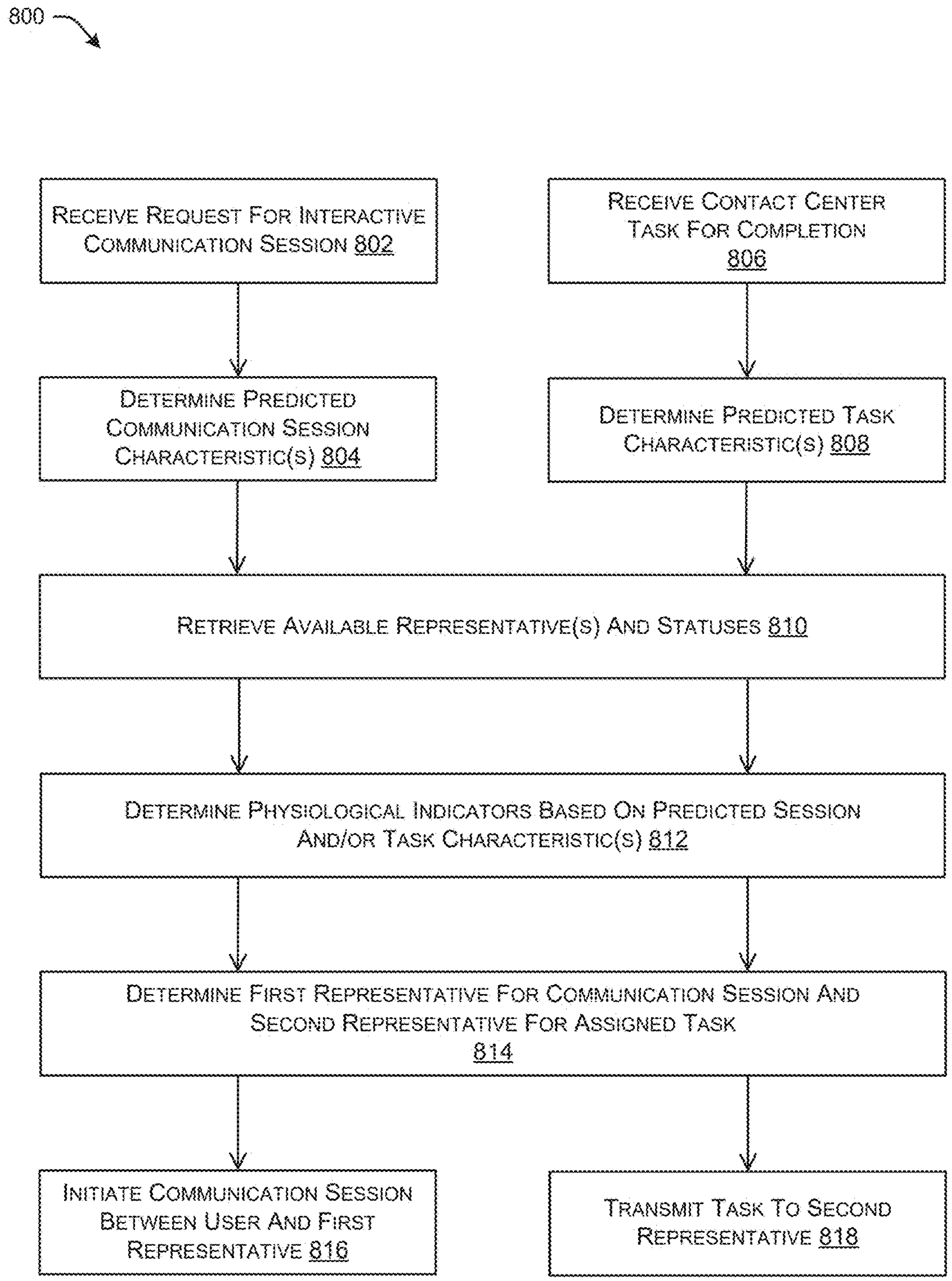
FIG. 8 is a flow diagram illustrating an example process for routing an interactive communication session and/or assigning a contact center task to a representative based on predicted session characteristics and associated representative physiological indicators, in accordance with one or more examples described herein.

FIG. 8 is another flow diagram illustrating an example process for routing interactive communication sessions and/or assigning additional contact center tasks to representatives, based on mappings between predicted session characteristics and associated representative physiological indicators. In various examples, some or all of the operations of process 800 may be performed by components within a contact center 102, such as contact queuing and/or routing components, task scheduling components, and/or workforce management components within a contact center manager 104.

At operation 802, a contact center 102 (e.g., a contact center manager 104) may receive a request for an interactive communication session from a user/customer external to the contact center. As described above, a request for an interactive communication session may be received by the contact center 102 from various remote user devices 114. Initially, a communication session request may be received via one or more communication portals/gateways 112, which may include voice communication portals, video communication portals, chat gateways, social media gateways, etc. A contact center manager 104 then may evaluate the request, including the communication channel, the user and/or client device requesting the session, and any initial input data relating to the session request (e.g., from automated phone menus, voice response units, chatbots, etc.). Based on the analysis, the contact center manager 104 may determine a communication service 108 to instantiate and/or handle the interactive session. The contact center manager 104 then may assign the requested communication session to a queue of the communication service 108 and/or may route the session directly to an available representative. When a selected representative becomes available to engage the communication session, the communication session may be initiated by the communication service 108, between the user device 114 and the representative device 116.

At operation 804, prior to assigning the requested communication session to a queue (or a specific representative), a queuing/routing component 310 within the contact center manager 104 may determine one or more predicted session characteristics for the requested communication session. The predicted characteristics associated with an incoming communication session request may include, for example, the type/category of the communication session, the communication medium (e.g., video, voice, chat, etc.) that will be used, the user's identity and status, the language that will be spoken, the client devices that will be used, the predicted network quality, and/or the issues are likely to be discussed or resolved during the communication, etc.

In addition to receiving requests for interactive communication sessions, the contact center 102 also may receive and/or generate tasks to be completed by representatives within the contact center environment 100. At operation 806, a task scheduling component 312 within the contact center manager 104 may receive one or more tasks that are be assigned to various representatives. Examples of tasks that can be performed by representatives while they are not engaged in live contacts can include, for example, reviewing data and completing required forms prior to or after a communication session, completing training to perform various work-related tasks and skills, reviewing the various pending queue statuses of the contact center to join/unjoin particular queues, and the like.

At operation 808, the task scheduling component 312 may determine one or more predicted characteristics associated with the task. The predicted characteristics associated with a contact center task may include, for example, an amount of time required to complete the task, technical skills required to perform the task, and/or any emotional content that the representative may be exposed to while performing the task (e.g., descriptions and/or graphic depictions of personal injuries or property damage, etc.).

At operation 810, the representative biometric system 106 may retrieve a listing of available representatives working in the contact center environment 100, along with various attributes and status data for the available representatives. The attributes and/or status data for the representatives may include language proficiencies and/or technical skill sets for the representatives, the levels of training, credentials, and seniority for the representatives, and the like. Additional representative status data may include the current (and/or recently captures) biometric data readings for the representatives, and/or current or recent physiological states associated with the representatives. In some examples, the representative biometric system 106 may retrieve and analyze the characteristics of the interactive communication sessions previously handled by each of the available representatives, to determine the potential or predicted physiological states that the representatives may be experiencing based on handling the previous sessions. As an example, the representative biometric system 106 may analyze the most recent previous communication sessions for two different representatives, determining that one previous session included characteristics of a high-stress session, and the other previous session did not. Additionally, in some examples, the representative biometric system 106 may analyze the characteristics of any number of previous sessions for the representatives, to aggregate or weight the characteristics associated with high-stress interactions, particular moods and/or emotions, over a previous time window for each representative.

At operation 812, the representative biometric system 106 may determine one or more corresponding physiological indicators for each of the available representatives, based on the predicted characteristics of the communication session requested in operation 802 and the received task in operation 806. As discussed above, different contact center representatives may behave differently and/or may experience different physiological states in response to similar situations (e.g., handling communication sessions having similar characteristics, performing similar tasks, etc.). Therefore, although the communication session requested in operation 802 may have only one set of predicted session characteristics, different representatives may have different sets of physiological indicators based on the predicted session characteristics. Similarly, although the received task in operation 806 may have the same characteristics regardless of the representative assigned to handle the tasks, the different representatives may exhibit different physiological indicators when handling the task.

At operation 814, based on the various physiological indicators determined for the available representatives, associated with the requested communication session and the received task, the representative biometric system 106 may determine one representative to handle the communication session and another representative to handle the assigned task. Based on the determinations in operation 814, the contact center manager 104 may initiate the requested communication session for the first selected (e.g., optimal) representative at operation 816, and may transmit the task to the representative device of the second selected (e.g., optimal) representative at operation 818. As discussed above, the determination of an optimal available representative to handle requested communication sessions and/or other contact center tasks may be based on any number of factors. In some examples, the representative biometric system 106 may use a scoring function to determine score values for the available representatives based on the characteristics of a requested communication session and/or task. In such examples, the current status of the representative, as well as the corresponding physiological indicators for the representative for engaging in the communication session or handling the task, may be used as variables of the scoring function.

Thus, as described herein, the various techniques for determining mappings (e.g., representative-specific or generalized mappings) between representative biometric data, physiological indicators, and the characteristics of the communication sessions and other contact center tasks, may provide a number of technical advantages for controlling automated operations of contact center environments. In various examples, mappings between representative biometric data and physiological indicators, and the associated mappings between physiological indicators and communication session characteristics, can be leveraged by the contact center systems to improve the performance and efficiency of contact routing, task scheduling, workforce management, and other contact center options. For instance, requests for communication sessions may be routed to particular representatives based on the predicted session characteristics of the communication sessions and the corresponding predicted physiological effects on the various representatives. The improved contact routing may take into account the predicted physiological states of the representative to improve user and representative satisfaction during the communication session of the live contact, as well as improving contact outcomes for the organization, reducing interventions and unnecessary callbacks, and improving contact metrics (e.g., sales, service satisfaction, etc.). The techniques described herein also may allow contact center servers to automatically improve representative working conditions on the scale of individual representatives, to provide less stressful and difficult communication sessions and other tasks that negatively impact the representative's stress, mood, focus, or emotions. Thus, these techniques also may improve representative motivation, focus, and overall production, and improve employee retention for representatives and other contact center workers.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method for using biometric data to control a contact center environment, the method comprising:

receiving session data associated with an interactive communication session between a first representative in the contact center environment and a remote user;

analyzing the session data to determine media content that was provided to the first representative, via a communication media type, during a first time period in the interactive communication session;

determining a session characteristic associated with the interactive communication session, based on the communication media type and based on determining that the media content included a depiction or description of a personal injury or property damage;

receiving biometric data associated with the first representative, for one or more times within the first time period during the interactive communication session;

determining, based on the biometric data, a physiological indicator of the first representative associated with providing the media content to the first representative;

determining an association between the session characteristic and the physiological indicator of the first representative; and controlling an automated function of the contact center environment, based on the association between the session characteristic and the physiological indicator of the first representative.

2. The method of claim 1, wherein controlling the automated function of the contact center environment comprises:

receiving, by a contact center server, a request for a second interaction communication session;

determining, based on the request, a predicted second session characteristic associated with the second interaction communication session;

determining a first score associated with the first representative, based on a mapping between the predicted second session characteristic and a second physiological indicator of the first representative; and assigning the second interaction communication session to a representative, based on the first score associated with the first representative.

3. The method of claim 1, wherein the physiological indicator comprises at least one of:

an indicator of a level of stress of the first representative;

an indicator of a level of focus of the first representative;

an indicator of a mood of the first representative; or an indicator of an emotion of the first representative.

4. The method of claim 1, further comprising:

determining, based on a second interactive communication session between a second representative and a second remote user, a second association between the session characteristic and a second physiological indicator of the second representative, wherein the second physiological indicator is different from the physiological indicator, wherein controlling the automated function of the contact center environment is further based on the second association between the session characteristic and the second physiological indicator of the second representative.

5. The method of claim 1, wherein determining the session characteristic comprises:

determining a sentiment associated with the interactive communication session; and determining a relationship between the first representative and the remote user in the interactive communication session, wherein the session characteristic is based on a combination of the sentiment and the relationship.

6. The method of claim 1, wherein receiving the biometric data comprises at least one of:

receiving, from a wearable device of the first representative, at least one of pulse data, respiration data, skin temperature data, or movement data; or receiving, from a camera in the contact center environment, at least one of temperature data, movement data, facial expression data, gaze direction data, or pupil dilation data.

7. The method of claim 1, further comprising:

receiving second biometric data associated with the remote user, for a second time period during the interactive communication session;

determining, based on the second biometric data, a second physiological indicator of the remote user; and determining a second association between the physiological indicator of the first representative and the second physiological indicator of the remote user, wherein controlling the automated function of the contact center environment is based on the second association between the physiological indicator and the second physiological indicator.

8. The method of claim 1, wherein determining the session characteristic comprises at least one of:

determining, based at least in part on the session data, that the first representative performed a technical task during the interactive communication session; or determining, based at least in part on the session data, that the first representative demonstrated a proficiency during the interactive communication session.

9. A contact center server, comprising:

one or more processors; and memory storing computer-executable instructions that, when executed by the one or more processors, cause the contact center server to perform operations comprising:

receiving, at the contact center server, a request for an interactive communication session associated with a remote user;

determining a predicted session characteristic associated with the interactive communication session, wherein determining the predicted session characteristic comprises:

analyzing at least one of an image, a video, or audio data associated with the request for the interactive communication session; and determining that the interactive communication session includes a predicted depiction of a personal injury or property damage;

retrieving, from a data store, a mapping between the predicted session characteristic and a first predicted physiological indicator of a first representative in a contact center environment, wherein the first predicted physiological indicator is associated with providing media content including depictions or descriptions of personal injury or property damage to the first representative;

assigning the first representative to the interactive communication session, based on the mapping; and initiating the interactive communication session between the first representative and the remote user.

10. The contact center server of claim 9, wherein the first predicted physiological indicator comprises at least one of:

an indicator of a level of stress of the first representative;

an indicator of a level of focus of the first representative;

an indicator of a mood of the first representative; or an indicator of an emotion of the first representative.

11. The contact center server of claim 9, the operations further comprising:

retrieving, from the data store, a second mapping between the predicted session characteristic and a second predicted physiological indicator of a second representative in the contact center environment, wherein the second predicted physiological indicator is different from the first predicted physiological indicator, wherein assigning the first representative to the interactive communication session comprises:

determining a first score associated with the first representative, based on the first predicted physiological indicator; and determining a second score associated with the second representative, based on the second predicted physiological indicator.

12. The contact center server of claim 9, wherein determining the predicted session characteristic further comprises:

determining a predicted sentiment associated with the remote user; and determining a relationship between the first representative and the remote user, wherein the predicted session characteristic is further based on the predicted sentiment and the relationship.

13. The contact center server of claim 9, the operations further comprising:

receiving current biometric data associated with the first representative, for a time period corresponding to the request for the interactive communication session; and determining, based on the current biometric data, a current physiological indicator of the first representative, wherein assigning the first representative to the interactive communication session is based on:

the current physiological indicator of the first representative; and the first predicted physiological indicator of the first representative associated with the predicted session characteristic.

14. The contact center server of claim 9, wherein assigning the first representative to the interactive communication session comprises:

monitoring the interactive communication session between the remote user and the first representative;

determining, based on the monitoring, an observed session characteristic associated with the interactive communication session, wherein the observed session characteristic is different from the predicted session characteristic; and based on the observed session characteristic, performing at least one of:

initiating an intervention during the interactive communication session;

determining a subsequent task for the first representative, following completion of the interactive communication session; or modifying working hours of the first representative within the contact center environment.

15. One or more non-transitory computer-readable media storing instructions executable by a processor, wherein the instructions, when executed by the processor, cause the processor to perform operations comprising:

receiving, at a contact center server, a request for an interactive communication session associated with a remote user;

determining a communication media type associated with the interactive communication session;

determining, based on the communication media type, a predicted session characteristic associated with the request for the interactive communication session, wherein determining the predicted session characteristic comprises determining that the interactive communication session includes a predicted depiction of a personal injury or property damage;

retrieving, from a data store, a mapping between the predicted session characteristic and a first physiological indicator of a first representative in a contact center environment;

assigning the first representative to the interactive communication session, based on the mapping; and initiating the interactive communication session between the first representative and the remote user.

16. The one or more non-transitory computer-readable media of claim 15, the operations further comprising:

retrieving, from the data store, a second mapping between the predicted session characteristic and a second physiological indicator of a second representative in the contact center environment, wherein the second physiological indicator is different from the first physiological indicator, wherein assigning the first representative to the interactive communication session comprises:

determining a first score associated with the first representative, based on the first physiological indicator; and determining a second score associated with the second representative, based on the second physiological indicator.

17. The one or more non-transitory computer-readable media of claim 15, wherein determining the predicted session characteristic further comprises:

determining a predicted sentiment associated with the remote user; and determining a relationship between the first representative and the remote user, wherein the predicted session characteristic is further based on the predicted sentiment and the relationship.

18. The method of claim 1, further comprising:

receiving second biometric data associated with the first representative, for a second time period during the interactive communication session, wherein the second time period is different from the first time period, wherein determining the physiological indicator of the first representative associated with providing the media content to the first representative, is based at least in part on comparing the biometric data for the first time period and the second biometric data for the second time period.

19. The method of claim 1, further comprising:

executing a second interactive communication session between the first representative and a second remote user in the contact center environment;

determining a second session characteristic associated with the second interactive communication session; and initiating an intervention during the second interactive communication session, based at least in part on the second session characteristic and the association between the session characteristic and the physiological indicator of the first representative.

20. The method of claim 1, further comprising:

receiving a request for a second interactive communication session associated with a second remote user;

determining a predicted second session characteristic associated with the second interactive communication session; and assigning the first representative to the second interactive communication session, based on the predicted second session characteristic and the association between the session characteristic and the physiological indicator of the first representative.

* * * * *